US007747983B2

(12) United States Patent
DeBruin et al.

(10) Patent No.: US 7,747,983 B2
(45) Date of Patent: Jun. 29, 2010

(54) SYSTEM AND METHOD FOR GENERATING A WEB SERVICE DEFINITION AND DATABASE SCHEMA FROM WIRELESS APPLICATION DEFINITION

(75) Inventors: David DeBruin, Guelph (CA); Daniel Mateescu, Toronto (CA); Bryan Goring, Milton (CA)

(73) Assignee: Research in Motion Limited, Waterloo, Ontario (CA)

( * ) Notice: Subject to any disclaimer, the term of this patent is extended or adjusted under 35 U.S.C. 154(b) by 1472 days.

(21) Appl. No.: 11/107,892

(22) Filed: Apr. 18, 2005

(65) Prior Publication Data

US 2006/0236306 A1 Oct. 19, 2006

(51) Int. Cl.
*G06F 9/45* (2006.01)
(52) U.S. Cl. ...................................... 717/124
(58) Field of Classification Search .................. 717/113, 717/124
See application file for complete search history.

(56) References Cited

U.S. PATENT DOCUMENTS

| 6,035,300 | A  | * | 3/2000  | Cason et al. ................. 707/102 |
| 6,694,002 | B2 | * | 2/2004  | Creamer et al. ........ 379/201.12 |
| 7,039,875 | B2 | * | 5/2006  | Khalfay et al. .............. 715/762 |
| 7,197,041 | B1 | * | 3/2007  | Tyebji ........................ 370/401 |
| 7,451,403 | B1 | * | 11/2008 | Srinivasan et al. .......... 715/763 |
| 2002/0063734 | A1 | * | 5/2002 | Khalfay et al. .............. 345/744 |
| 2002/0085020 | A1 | * | 7/2002 | Carroll, Jr. .................. 345/700 |
| 2002/0099456 | A1 | * | 7/2002 | McLean ....................... 700/83 |
| 2004/0054969 | A1 |   | 3/2004 | Chiang et al. |
| 2005/0193361 | A1 | * | 9/2005 | Vitanov et al. ................ 716/19 |
| 2007/0256059 | A1 | * | 11/2007 | Sullivan et al. ............. 717/139 |

FOREIGN PATENT DOCUMENTS

EP 1 387 262 A 4/2004

OTHER PUBLICATIONS

European Search Report dated Oct. 7, 2005 Ceri S et al: "Web Modeling Language (WebML): a modeling language for designing Web Sites" Computer Networks, Elsevier Science Publishers B.V., Amsterdam, NL., vol. 33, No. 1-6, Jun. 2000, pp. 137-157, XP004304764 ISSN: 1389-1286 abstract p. 138, right-hand column—p. 139, left hand column.
Glass G: "The Web services (r)evolution: Part 4. Web Services Description Language (WSDL)" Internet Article, Feb. 1, 2001, XP002247117 p. 1, line 28—p. 2, line 35 p. 3, line 30—p. 7, line 8.

* cited by examiner

*Primary Examiner*—John Chavis
(74) *Attorney, Agent, or Firm*—Gowling Lafleur Henderson LLP; Xiang Lu

(57) ABSTRACT

A system and method for generating a service interface definition for a data source from an application definition is provided. The system and method includes: a component processor for examining components forming a component based application, which include a screen component having screen definitions, to identify a screen control mapping identifying a transition between a source screen and a target screen. The system and method includes a service interface generation engine for generating a Web service definition for a Web service interface of a backend server of a data source, based on an operation definition describing an action supported by the data source. The operation definition is constructed based on the identified transition.

16 Claims, 11 Drawing Sheets

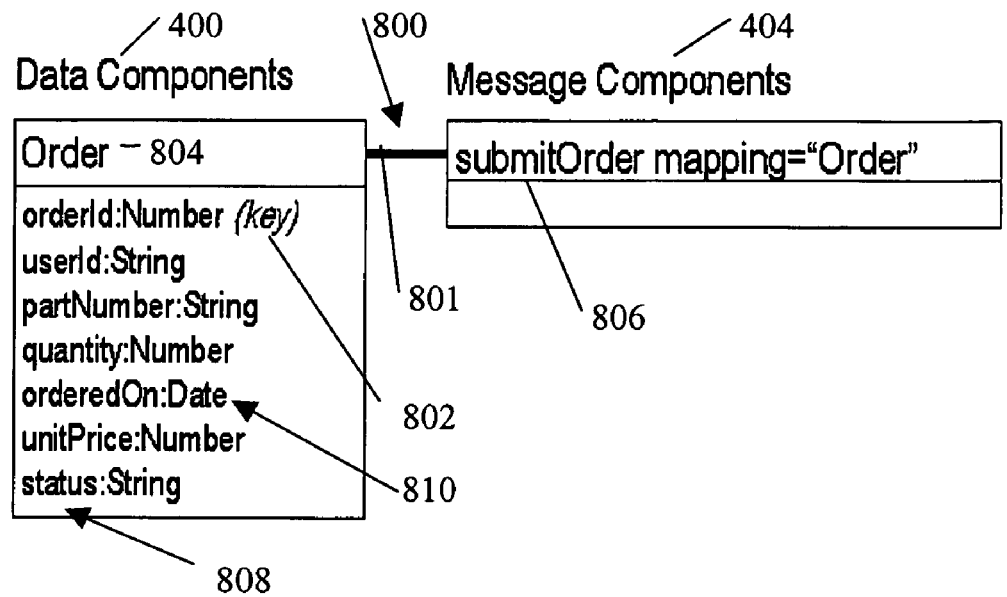

Figure 6A

```
                400                                           802
<wcData name="Order" pkey="orderId">
    <dfield name="orderId" type="Number"/>
812 <dfield name="userId" type="String"/>
    <dfield name="specialName" type="String"/>
    <dfield name="confirmationId" type="Number"/>
    <dfield name="deliveryTime" type="Date"/>
    <dfield name="status" type="String"/>
</wcData>
<wcMsg name="submitOrder" mapping="Order"/>
     404
```

Figure 6B

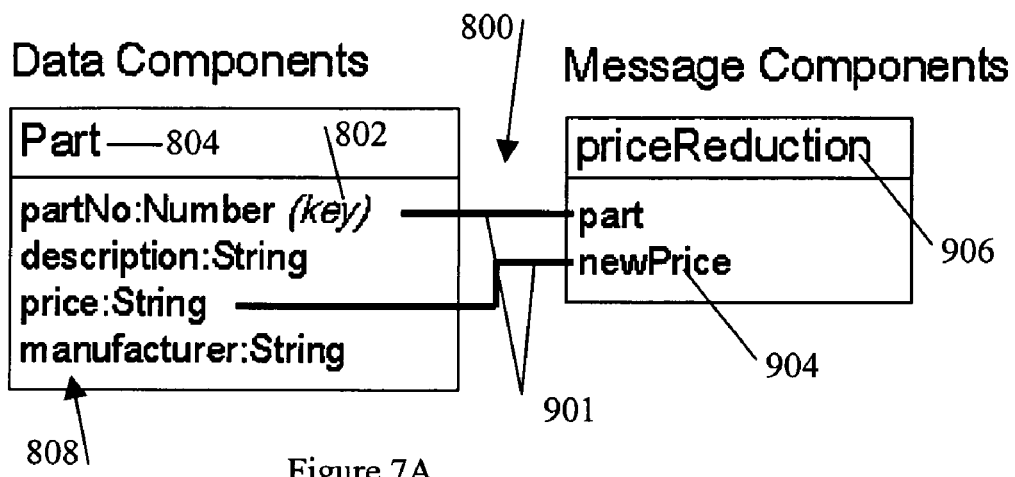

Figure 7A

```
                    ╱ 400                          ╱ 802
        <wcData name="Part" pkey="partNo">
            <dfield name="partNo" type="Number"/>
  808
     ↘   <dfield name="description" type="String"/>
            <dfield name="price" type="String"/>
            <dfield name="manufacturer" type="String"/>
        </wcData>
                                                    ╱ 901
        <wcMsg name="priceReduction">
            <dfield name="part" mapping="Part.partNo"/>
            <dfield name="newPrice" mapping="Part.price"/>
        </wcMsg>
              904                                      901
           404
```

Figure 7B

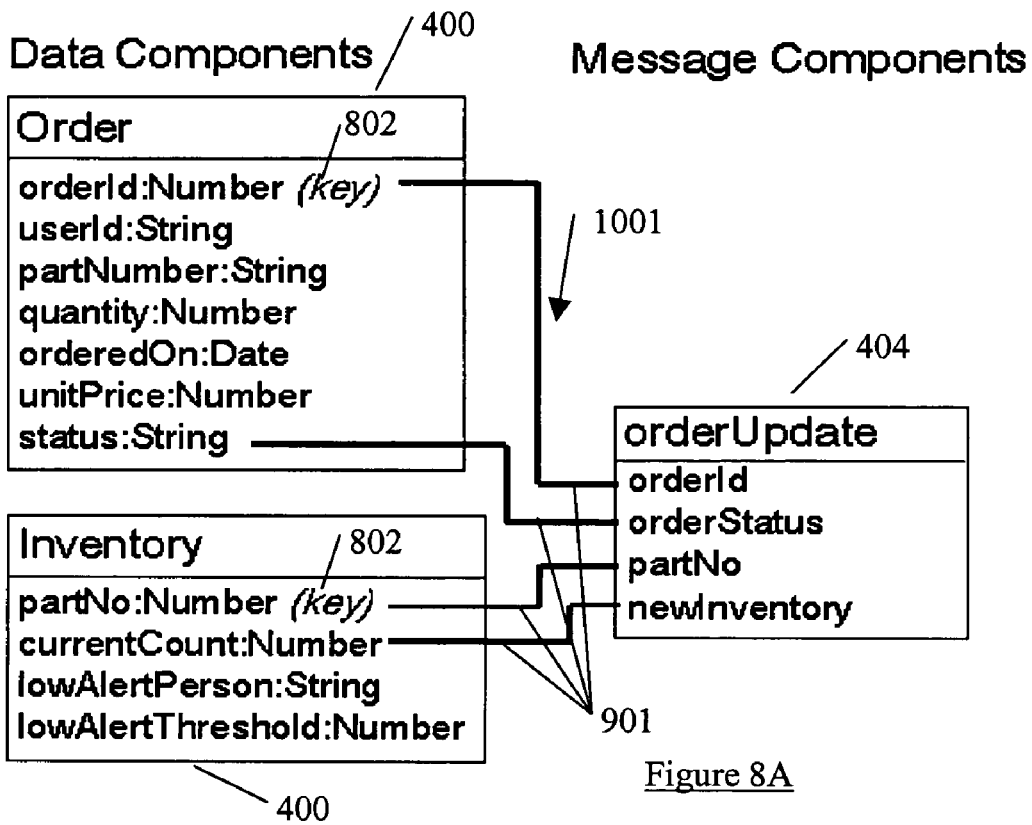

Figure 8A

```
                                                    802
<wcData name="Order" pkey="orderId">
   <dfield name="orderId" type="Number"/>
   <dfield name="userId" type="String"/>
   <dfield name="specialName" type="String"/>
   <dfield name="confirmationId" type="Number"/>
   <dfield name="deliveryTime" type="Date"/>
   <dfield name="status" type="String"/>
</wcData>
<wcData name="Inventory" pkey="partNo">          802
   <dfield name="partNo" type="Number"/>
   <dfield name="currentCount" type="Number"/>
   <dfield name="lowAlertPerson" type="String"/>
   <dfield name="lowAlertThreshold" type="Number"/>
</wcData>
<wcMsg name="orderUpdate">                                901
   <dfield name="orderId" mapping="Order.orderId"/>
   <dfield name="orderStatus" mapping="Order.status"/>
   <dfield name="partNo" mapping="Inventory.partNo"/>
   <dfield name="newInventory" mapping="Inventory.currentCount"/>
</wcMsg>
```

Figure 8B

SYSTEM AND METHOD FOR GENERATING A WEB SERVICE DEFINITION AND DATABASE SCHEMA FROM WIRELESS APPLICATION DEFINITION

BACKGROUND

This application relates generally to development of service interface definitions and their availability over a network.

There are a continually increasing number of terminals and mobile devices in use today, such as smart phones, PDAs with wireless communication capabilities, personal computers, self-service kiosks and two-way pagers/communication devices. Software applications which run on these devices increase their utility. For example, a smart phone may include an application, which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task.

Currently, mobile communication devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of mobile device, thereby providing a relatively optimized application program for each runtime environment. However, native applications have a disadvantage of not being platform independent, thereby necessitating the development of multiple versions of the same application, as well as being relatively large in size, thereby taxing the memory resources of the mobile device. Further, application developers need experience with programming languages such as Java and C++ to construct these hard coded native applications. There is a need for service interface development environments that can assist in the development of backend service interfaces that are compatible with the applications developed for selected devices and terminals. Further, the power of wireless applications consists in the ability of communicating to various data sources (e.g. databases, web services, etc) and in passing complex data structures back and forth to these data sources. However, designing complex wireless applications and their respective service interfaces to account for the data structures and associated messaging requires a great degree of development effort from the developer.

SUMMARY OF THE INVENTION

It is an object of the present invention to provide a service interface development environment to obviate or mitigate at least some of the above-presented disadvantages.

Application developers need experience with programming languages such as Java and C++ to construct these hard coded native applications. There is a need for service interface development environments that can assist in the development of backend service interfaces that are compatible with the applications developed for selected devices and terminals. Further, the power of wireless applications consists in the ability of communicating to various data sources (e.g. databases, web services, etc) and in passing complex data structures back and forth to these data sources. However, designing complex wireless applications and their respective service interfaces to account for the data structures and associated messaging requires a great degree of development effort from the developer.

Contrary to current application generation environments a system and method is provided for generating a service interface definition for a data source from an application definition. The application definition including a screen component having screen definitions expressed in a first structured definition language for defining the visualization of a data structure when displayed on a graphical user interface of a device when in communication with the data source over a network. The visualized data structure related to data content associated with the messages communicated over the network between the device and the data source via the service interface. The system and method comprising: a service interface generation engine configured for coordinating the processing of screen control mappings identified from the screen component in generation of the service interface, the screen control mappings for defining a work flow of the screen described by the screen component in the context of the application; a message definition module of the engine for generating a message definition set related to the identified control mappings, the message definition set for describing the data structure communicated between the device and the data source, the message definition set expressed in a second structured definition language; an operation definition module of the engine for generating an operation definition describing an action supported by the data source, the operation definition expressed in the second structured definition language; and optionally a rule processor configured for providing to the generator modules a format of the definitions according to a service definition template during generation of the definitions; wherein the message definition set is assignable to the operation definition during generation of the service interface.

Accordingly, a system is provided for generating a service interface definition for a data source from an application definition, the application definition including a screen component having screen definitions expressed in a first structured definition language for defining the visualization of a data structure when displayed on a graphical user interface of a device when in communication with the data source over a network, the visualized data structure related to data content associated with the messages communicated over the network between the device and the data source via the service interface, the system comprising: a service interface generation engine configured for coordinating the processing of screen control mappings identified from the screen component in generation of the service interface, the screen control mappings for defining a work flow of the screen described by the screen component in the context of the application; a message definition module of the engine for generating a message definition set related to the identified control mappings, the message definition set for describing the data structure communicated between the device and the data source, the message definition set expressed in a second structured definition language; and an operation definition module of the engine for generating an operation definition describing an action supported by the data source, the operation definition expressed in the second structured definition language;

wherein the message definition set is assignable to the operation definition during generation of the service interface.

Also disclosed is a method for generating a service interface definition for a data source from an application definition, the application definition including a screen component having screen definitions expressed in a first structured definition language for defining the visualization of a data structure when displayed on a graphical user interface of a device when in communication with the data source over a network, the visualized data structure related to data content associated with the messages communicated over the network between the device and the data source via the service interface, the method comprising the steps of: identifying screen control mappings from the screen component in generation of the service interface, the screen control mappings for defining a work flow of the screen described by the screen component in the context of the application; generating a message definition set related to the identified control mappings, the message definition set for describing the data structure communicated between the device and the data source, the message definition set expressed in a second structured definition language; and generating an operation definition describing an action supported by the data source, the operation definition expressed in the second structured definition language; wherein the message definition set is assigned to the operation definition during generation of the service interface.

Also disclosed is a computer program product for generating a service interface definition for a data source from an application definition, the application definition including a screen component having screen definitions expressed in a first structured definition language for defining the visualization of a data structure when displayed on a graphical user interface of a device when in communication with the data source over a network, the visualized data structure related to data content associated with the messages communicated over the network between the device and the data source via the service interface, the computer program product comprising: a computer readable medium; a service interface generation engine stored on the medium and configured for coordinating the processing of screen control mappings identified from the screen component in generation of the service interface, the screen control mappings for defining a work flow of the screen described by the screen component in the context of the application; a message definition module coupled to the engine module for generating a message definition set related to the identified control mappings, the message definition set for describing the data structure communicated between the device and the data source, the message definition set expressed in a second structured definition language; and an operation definition module coupled to the engine module for generating an operation definition describing an action supported by the data source, the operation definition expressed in the second structured definition language; wherein the message definition set is assignable to the operation definition during generation of the service interface.

BRIEF DESCRIPTION OF THE DRAWINGS

These and other features will become more apparent in the following detailed description of the present invention in which reference is made to the appended drawings wherein:

FIGS. 6a and 6b are examples of a message level mapping for the application of FIG. 4;

FIGS. 7a and 7b are examples of a field level mapping for the application of FIG. 4;

FIGS. 8a and 8b are examples of a complex mapping for the application of FIG. 4;

DESCRIPTION OF THE PREFERRED EMBODIMENTS

Network System

Figure 1:
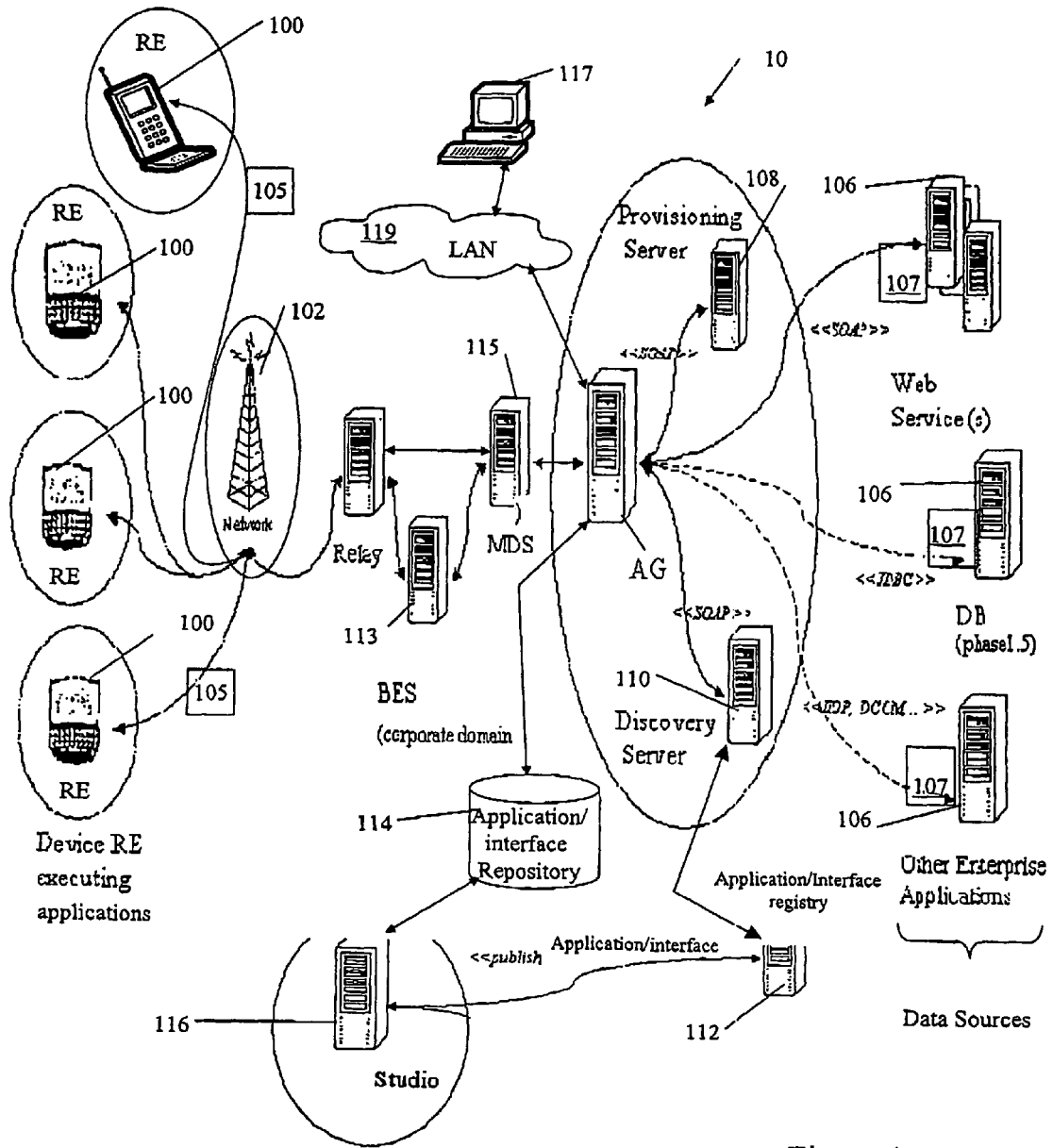
FIG. 1 is a block diagram of a communication network system.

Referring to FIG. 1, a network system 10 comprises mobile communication devices 100 for interacting with one or more backend data sources 106 (e.g. a schema based service such as web service or database that provides enterprise services used by an application 105) via a wireless network 102 coupled to an application gateway AG. The data source 106 is described by a service interface 107, further described below. The devices 100 are devices such as but not limited to mobile telephones, PDAs, two-way pagers, dual-mode communication devices. The network 10 can also have desktop computers 117 coupled though a local area network 119. The devices 100 and desktop computers 117 of the network 10 are hereafter referred to as the devices 100 for the sake of simplicity. It is recognised that the application gateway AG and data sources 106 can be linked via extranets (e.g. the Internet) and/or intranets as is known in the art. The application gateway AG can handle request/response messages initiated by the application 105 as well as subscription notifications pushed to the device 100 from the data sources 106.

The Application Gateway AG can function as a Data Mapping Server for mediating messaging between a client runtime RE on the device 100 and a backend server of the data sources 106 through the interface 107 as implemented. The Runtime Environment RB is an intelligent container that executes application 105 components and provides common services as needed for execution of the applications 105. The gateway AG can provide for asynchronous messaging for the applications 105 and can integrate and communicate with legacy back-end data sources 106 through the interface 107. The devices 100 transmit and receive the Wireless Component Applications technology or wireless component applications 105, as further described below, when in communication with the data sources 106, as well as transmit/receive messaging associated with operation of the applications 105. The devices 100 can operate as web clients of the data sources 106 via the interface 167, through execution of the applications 105 when provisioned on respective runtime environments RE of the devices 100. It is recognised that the devices 100 could also communicate directly with the data sources 106 via the interface 107 over the network 10 (i.e. without intervention of the application gateway AG) as desired. The following description of device 100—data source 106 message communication is described using the application gateway AG by way of example only. Accordingly, the capabilities and functionality of the application gateway AG could be provided by the runtime environment RE of the device 100, by the data source 106 itself, or a (combination thereof.

For satisfying the appropriate messaging associated with the applications 105, the application gateway AG communicates with the data sources 106 through various protocols (such as but not limited to HTTP, SQL, and component API) for exposing relevant business logic (methods) to the applications 105 once provisioned on the devices 100. The applications 105 can use the business logic of the data sources 106 similarly to calling a method on an object (or a function). It is recognized that the applications 105 can be downloaded/uploaded in relation to data sources 106 via the network 102 and application gateway AG directly to the devices 100.

The application gateway AG is coupled to a provisioning server 108 and a discovery server 110 for providing a mechanism for optimized over-the-air provisioning of the applications 105, including capabilities for application 105 discovery from the device 100 as listed in a UDDI (for example) registry 112. The Registry 112 can be part of the Discovery Service implemented by the server 110, and the registry 112 is used for publishing the applications 105 and/or the related service interface 107. The information in the registry 112 can contain such as but not limited to a Deployment Descriptor DD (contains information such a; name, version, and description) as well as the location of this application 105 and/or service interface 107 in a repository 114, once the service interface 107 is generated by a developer using the tool 116 and then uploaded to the network 10.

Referring again to FIG. 1, for initialization of the runtime environment RE of the device 100, the RE receives the gateway AG URL and the gateway AG public key in a MDS 115 service book. The runtime environment RE uses this information to connect to the gateway AG for initial handshaking. Device 100 provisioning or BES 113, depending on the domain, pushes the MDS 115 service book to the device 100. It is recognised there could be more than one gateway AG in the network 10, as desired. Once initialized, access to the applications 105 by the devices 100, as downloaded/uploaded, can be communicated via the gateway AG directly from the application repository 114, and/or in association with data source 106 direct access (not shown) to the repository 114. Further, it is recognised that access to the generated service interfaces 107 (in conjunction with the related application 105) can also be facilitated via the repository 114.

Example Data Source 106 and Interface 107

Data sources 106 can be described, for example, using WSDL (Web Services Description Language) and therefore presented to the network as a service commonly referred to as a web service through the defined service interface 107. For example, the service interface 107 can be described using WSDL written in XML (as an XML document) describing the Web services and where to locate the Web services, i.e. the XML document can specify the location of the web service and the operations (or methods) the service exposes to the network (e.g. Internet). WSDL refers to a Web Services Description Language, which is a standard language/format used to base the definition content, for example, of the defined service interface 107 (see http://www.w3.org/TR/wsdl—Web Services Description Language (WSDL) 1.1).

As communications protocols and message formats are standardized in the web community, it becomes increasingly possible and important to be able to describe the communications in some structured way. WSDL, for example, addresses this need by defining an XML grammar for describing network services as collections of communication endpoints capable of exchanging messages. WSDL service definitions provide documentation for distributed systems and serve as a recipe for automating the details involved in applications communication.

The WSDL interface 107 document defines services as collections of network endpoints, or ports. In WSDL, the abstract definition of endpoints and messages is separated from their concrete network deployment or data format bindings. This allows the reuse of abstract definitions: messages, which are abstract descriptions of the data being exchanged, and port types which are abstract collections of operations. The concrete protocol and data format specifications for a particular port type constitutes a reusable binding. A port is defined by associating a network address with a reusable binding, and a collection of ports define a service.

Hence, the WSDL document for the interface 107 uses the following elements in the definition of network services, such as but not limited to:

Types—a container for data type definitions using some type system (such as XSD).

Message—an abstract, typed definition of the data being communicated.

Operation—an abstract description of an action supported by the service.

Port Type—an abstract set of operations supported by one or more endpoints.

Binding—a concrete protocol and data format specification for a particular port type.

Port—a single endpoint defined as a combination of a binding and a network address.

Service—a collection of related endpoints.

These elements are described further detail below. It is important to observe that WSDL does not introduce a new type definition language, WSDL recognizes the need for rich type systems for describing message formats, and supports the XML Schemas specification (XSD) as its canonical type system. However, since it is unreasonable to expect a single type system grammar to be used to describe all message formats present and future, WSDL allows using other type definition languages via extensibility. In addition, WSDL defines a common binding mechanism. This is used to attach a specific protocol or data format or structure to an abstract message, operation, or endpoint. WSDL allows the reuse of abstract definitions. In addition to the core service definition framework, this specification introduces specific binding extensions for the following protocols and message formats, such as but not limited to:

SOAP 1.1;

HTTP GET/POST; and

MIME.

As noted above, the WSDL document defines the web service using major elements, such as but not limited to: <portType> being the operations performed by the web service (each operation can be compared to a function in a traditional programming language such that the function is resident on the web service itself); <message> being the message formats used by the web service; <types> being the data types used by the web service and being typically part of the messages themselves; and <binding> being the communication protocols used by the web service for communicating the messages between the web service 106 and the application gateway AG. Further, a service element could be included in the WSDL document to identify the location (e.g. URL) of the web service itself and to manage the logical network connection between the application gateway AG (for example) and the web service 106 according to the communication protocols provided by the binding element. It is recognised that the particular description of the WSDL interface 107 of the data source 106 is generated by the tool 116 in view of the definitions of the components 400,402,404,406 of the application 105. These component definitions can include such as but not limited to the descriptions for data format and message format content from screen component 402 content of the predefined application 105, as further described below.

The WSDL document can for example be used by the application gateway AG for brokering the messaging between the web service via the interface 107 and the device(s) 100. The WSDL document can also contain other elements, like extension elements and a service element that makes it possible to group together the definitions of several web services in one single WSDL document. The <portType> element of the interface 107 defines the web service, the operations that can be performed by the web service, and the messages that are involved with respect to the web service operations. A WSDL port describes the interfaces (legal operations) exposed by the web service. The <portType> element can be compared to a function library (or a module, or a class) in a traditional programming language. The <message> element of the interface 107 defines the data elements of the operation as well as the name associated with each of the messages for interaction with the operation. Each message can consist of one or more parts. The parts can be compared to the parameters of a function call in a traditional programming language, such that the function is part of the web service itself. The <types> element of the interface 107 defines the data types that are used by the web service. To help in providing maximum platform neutrality, WSDL uses XML Schema syntax to define data types. The <binding> element of the interface 107 defines the message format and communication protocol details for each operation, such that the message format and communication protocol is such as expected by the web service 106.

The request-response operation type is the most common operation type, but the interface 107 can have any of four operation types, for example, such as but not limited to: One-way where the operation can receive a message but will not return a response; Request-response where the operation can receive a request and will return a response; Solicit-response where the operation can send a request and will wait for a response; and Notification where the operation can send a message but will not wait for a response.

OPERATION EXAMPLES

A port type is a named set of abstract operations and the abstract messages involved.

```
<wsdl:definitions .... >
    <wsdl:portType name="nmtoken">
        <wsdl:operation name="nmtoken" .... /> *
    </wsdl:portType>
</wsdl:definitions>
```

The port type name attribute provides a unique name among all port types defined within in the enclosing WSDL document. An operation is named via the name attribute.

One-Way Operation

The grammar for a one-way operation is:

```
<wsdl:definitions .... > <wsdl:portType .... > *
    <wsdl:operation name="nmtoken">
        <wsdl:input name="nmtoken"? message="qname"/>
    </wsdl:operation>
</wsdl:portType >
</wsdl:definitions>
```

The input element specifies the abstract message format for the one-way operation.

Request-Response Operation

The grammar for a request-response operation is:

```
<wsdl:definitions .... >
    <wsdl:portType .... > *
        <wsdl:operation name="nmtoken" parameterOrder="nmtokens">
            <wsdl:input name="nmtoken"? message="qname"/>
            <wsdl:output name="nmtoken"? message="qname"/>
            <wsdl:fault name="nmtoken" message="qname"/>*
        </wsdl:operation>
    </wsdl:portType >
</wsdl:definitions>
```

The input and output elements specify the abstract message format for the request and response, respectively. The optional fault elements specify the abstract message format for any error messages that may be output as the result of the operation (beyond those specific to the protocol). Note that a request-response operation is an abstract notion; a particular binding must be consulted to determine how the messages are actually sent: within a single communication (such as a HTTP request/response), or as two independent communications (such as two HTTP requests).

Solicit-Response Operation

The grammar for a solicit-response operation is:

```
<wsdl:definitions .... >
    <wsdl:portType .... > *
        <wsdl:operation name="nmtoken" parameterOrder="nmtokens">
            <wsdl:output name="nmtoken"? message="qname"/>
            <wsdl:input name="nmtoken"? message="qname"/>
            <wsdl:fault name="nmtoken" message="qname"/>*
        </wsdl:operation>
    </wsdl:portType>
</wsdl:definitions>
```

The output and input elements specify the abstract message format for the solicited request and response, respectively. The optional fault elements specify the abstract message format for any error messages that may be output as the result of the operation (beyond those specific to the protocol). Note that a solicit-response operation is an abstract notion; a particular binding must be consulted to determine how the messages are actually sent: within a single communication (such as a HTTP request/response), or as two independent communications (such as two HTTP requests).

Notification Operation

The grammar for a notification operation is:

```
<wsdl:definitions .... >
    <wsdl:portType .... > *
        <wsdl:operation name="nmtoken">
            <wsdl:output name="nmtoken"? message="qname"/>
        </wsdl:operation>
    </wsdl:portType >
</wsdl:definitions>
```

The output element specifies the abstract message format for the notification operation.

WSDL bindings define the message format and protocol details for the web service 106. The binding element has two attributes—the name attribute and the type attribute. The name attribute (you can use any name you want) defines the name of the binding, and the type attribute points to the port for the binding, in this case the "glossaryTerms" port. The soap:binding element has two attributes—the style attribute and the transport attribute. The style attribute can be "rpc" or "document". In this case we use document. The transport attribute defines the SOAP protocol to use. In this case we use HTTP. The operation element defines each operation that the port exposes. For each operation the corresponding SOAP action has to be defined. You must also specify how the input and output are encoded. In this case we use "literal". It is understood that protocols other than SOAP can be used, if desired.

The binding defines message format and protocol details for operations and messages defined by a particular portType. There may be any number of bindings for a given portType. The example grammar for a binding is as follows:

```
<wsdl:definitions .... >
    <wsdl:binding name="nmtoken" type="qname"> *
        <-- extensibility element (1) --> *
        <wsdl:operation name="nmtoken"> *
            <-- extensibility element (2) --> *
            <wsdl:input name="nmtoken"? > ?
                <-- extensibility element (3) -->
            </wsdl:input>
            <wsdl:output name="nmtoken"? > ?
                <-- extensibility element (4) --> *
            </wsdl:output>
            <wsdl:fault name="nmtoken"> *
                <-- extensibility element (5) --> *
            </wsdl:fault>
        </wsdl:operation>
    </wsdl:binding>
</wsdl:definitions>
```

The name attribute provides a unique name among all bindings defined within in the enclosing WSDL document. The binding references the portType that it binds using the type attribute. This QName value follows the linking rules defined by the WSDL standard. Binding extensibility elements are used to specify the concrete grammar for the input (3), output (4), and fault messages (5). Per-operation binding information (2) as well as per-binding information (1) may also be specified. An operation element within a binding specifies binding information for the operation with the same name within the binding's portType. Since operation names are not required to be unique (for example, in the case of overloading of method names), the name attribute in the operation binding element might not be enough to uniquely identify an operation. In that case, the correct operation should be identified by providing the name attributes of the corresponding wsdl:input and wsdl:output elements.

General Interface 107 WSDL Example

The following is a simplified fraction of an example WSDL document.

```
<message name="getTermRequest">
    <part name="term" type="xs:string"/>
</message>
<message name="getTermResponse">
    <part name="value" type="xs:string"/>
</message>
<portType name="glossaryTerms">
    <operation name="getTerm">
        <input message="getTermRequest"/>
        <output message="getTermResponse"/>
    </operation>
</portType>
<binding type="glossaryTerms" name="b1">
<soap:binding style="document"
transport="http://schemas.xmlsoap.org/soap/http" />
    <operation>
        <soap:operation
         soapAction="http://example.com/getTerm"/>
        <input>
            <soap:body use="literal"/>
        </input>
        <output>
            <soap:body use="literal"/>
        </output>
    </operation>
</binding>
```

In the above example the portType element defines "glossaryTerms" as the name of the port, and "getTerm" as the name of the corresponding operation. The "getTerm" operation has an input message called "getTermRequest" and an output message called "getTermResponse". The message elements define the parts of each message and the associated data types. Compared to traditional programming, glossaryTerms can be a function library, "getTerm" can be a function with "getTermRequest" as the input parameter and getTermResponse as the return parameter.

Interface Design Tool 116

Referring to FIG. 1, the applications 105 can be stored in the repository 114 as a series of packages. The Studio developer tool 116, which is employed by developers to generate the interface 107 in view of the predefined application components 400,402,404,406 (see FIG. 4). The developer design tool 116 can be a RAD tool used to develop the interfaces 107. The tool 116 can provide support for a drag-and drop graphical approach for the visual design of the interface 107 in view of such as but not limited to screen components 402 and data components 400, as further defined below. The interfaces 107 are represented as metadata (XML) that can be generated automatically by the tool 116 through an automatic code generation process.

Figure 2:
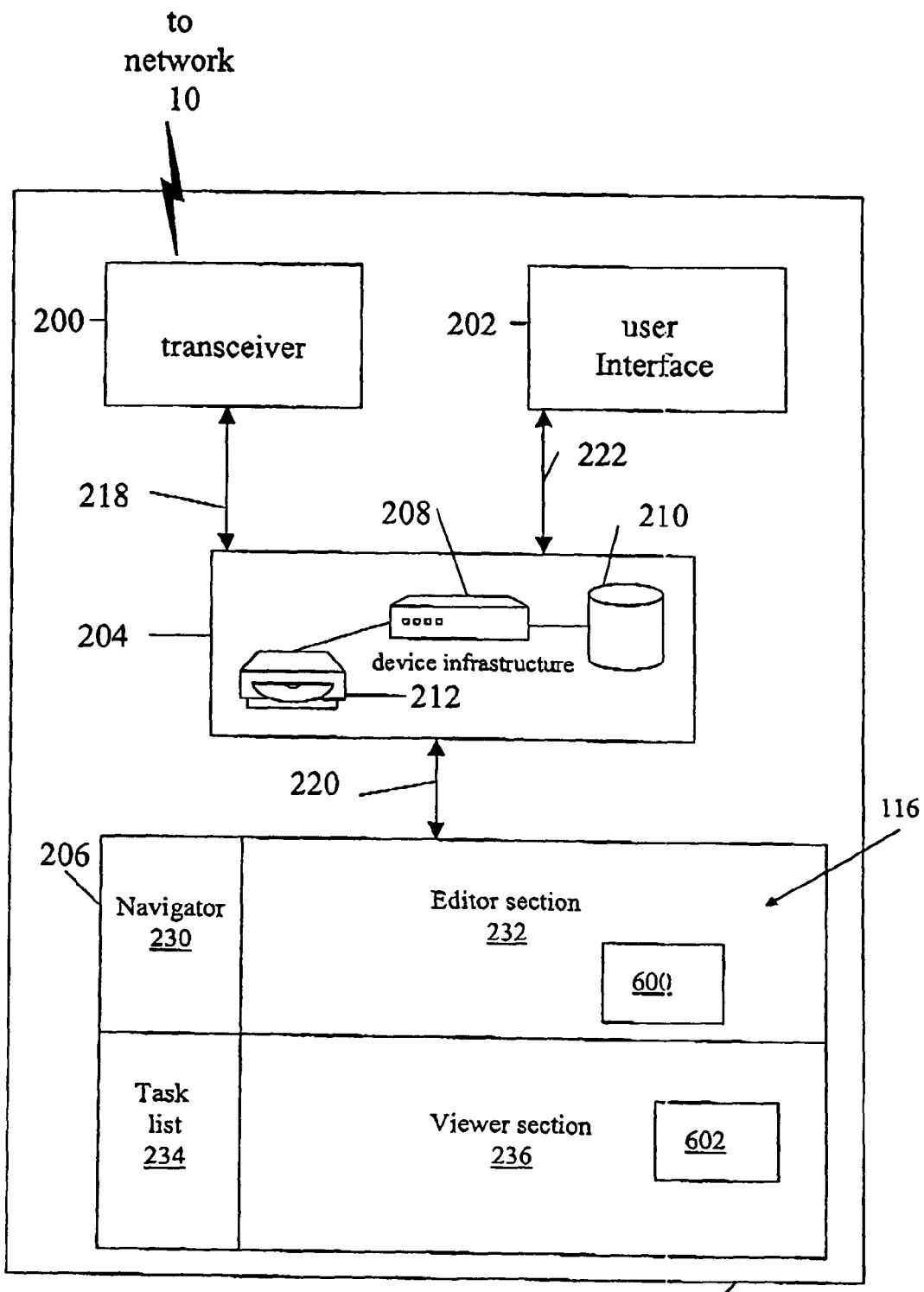
FIG. 2 is a block diagram of a tool for developing and generating the service interfaces of FIG. 1.

Referring to FIG. 2, the tool 116 is operated on a computer 201 that can be connected to the network 10 via a network connection interface such as a transceiver 200 coupled via connection 218 to a device infrastructure 204. The transceiver 200 can be used to communicate completed interfaces 107 to the repository 114 (see FIG. 1), as well as access the registry 112, and optionally to retrieve predefined applications 105 from the network 10 for use in generation of the interface 107. Referring again to FIG. 2, the developer design tool 116 also has a user interface 202, coupled to the device infrastructure 204 by connection 222, to interact with a user (not shown). The user interface 202 includes one or more user input devices such as but not limited to a keyboard, a keypad, a track wheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the tool 116 to coordinate the design of interfaces 107 using a series of editors 600 and viewers 602 (see FIG. 2) to assist/drive in the workflow of the development process.

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface 202 and the display 206 of the tool 116 by executing related instructions, which are provided by an operating system and interface 107 design editors 600, wizards, dialogs and viewers 602 resident in the memory module 210. Further, it is recognized that the device infrastructure 204 can include a computer readable storage medium 212 coupled to the processor 208 for providing instructions to the processor 208 and/or to load/design any of the interfaces 107 also resident (for example) in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the design tool 116 is operated on the computer 201 as a development environment for developing the service interfaces 107. The development methodology of the tool 116 can be based on a visual "drag and drop" system of building the interface 107 data, messaging behaviour, and port/binding elements. The tool 116 can be structured as a set of plug-ins to a generic integrated design environment (IDE) framework, such as but not limited to the Eclipse framework, or the tool 116 can be configured as a complete design framework without using plug-in architecture. For exemplary purposes only, the tool 116 will now be described as a plug-in design environment using the Eclipse framework.

Referring to FIGS. 2 and 6, Eclipse makes provisions for a basic, generic tool 116 environment that can be extended to provide custom editors, wizards, project management and a host of other functionality. The Eclipse Platform is designed for building integrated development environments (IDEs) that can be used to create applications as diverse as web sites, embedded Java™ programs, C++ programs, and Enterprise JavaBeans™. The navigator view 230 shows files in a user's (e.g. developer) workspace; a text editor section 232 shows the content of a file being worked on by the user of the tool 116 to develop the interface 107 from the associated components 400,402,404,406 (see FIG. 4) in question; the tasks view section 234 shows a list of to-dos for the user of the tool 116; and the outline viewer section 236 shows for example a content outline of the interface 107 being designed/edited, and/or may augment other views by providing information about the currently selected object such as properties of the object selected in another view. It is recognised that the tool 116 aids or otherwise automates for the developer in creating and modifying the coded definition content of the interface 107 in the structured definition language (e.g. in XML). Further, the tool 116 also aids the developer in validating the interdependencies of the definition content between the components 400,402,404, such as but not limited to message/data and screen/data relationships. It is also recognised that presentation on the display of wizard and dialog content for use by the developer (during use of the editors 600 and viewers 602) can be positioned in one of the sections 230,232,234,236 and/or in a dedicated wizard section (not shown), as desired.

The Eclipse Platform is built on a mechanism for discovering, integrating, and running modules called plug-ins (i.e. editors 600 and viewers 602). When the Eclipse Platform is launched via the UI 202 of the computer 201, the user is presented with an integrated development environment (IDE) on the display 206 composed of the set of available plug-ins, such as editors 600 and viewers 602. The various plug-ins to the Eclipse Platform operate on regular files in the user's workspace indicated on the display 206. The workspace consists of one or more top-level projects, where each project maps to a corresponding user-specified directory in the file system, as stored in the memory 210 (and/or accessible on the network 10), which are navigated using the navigator 230. The Eclipse Platform UI paradigm is based on editors, views, and perspectives. From the users standpoint, a workbench display 206 consists visually of views 602 and editors 600. Perspectives manifest themselves in the selection and arrangements of editors 600 and views 602 visible on the display 206. Editors 600 allow the user to open, edit, and save objects. The editors 600 follow an open-save-close lifecycle much like file system based tools. When active, a selected editor 600 can contribute actions to a workbench menu and tool bar. Views 602 provide information about some object that the user is working with in the workbench. A viewer 602 may assist the editor 600 by providing information about the document being edited. For example, viewers 602 can have a simpler lifecycle than editors 600, whereby modifications made in using a viewer 602 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 602 and editors 600 that are arranged (tiled, stacked, or detached) for presentation on the display 206. it is recognised that the development environment of the tool 116 for the interface 107 generation can be interactive with the developer, fully automated, or a combination thereof.

Component Applications 105

Figure 3:
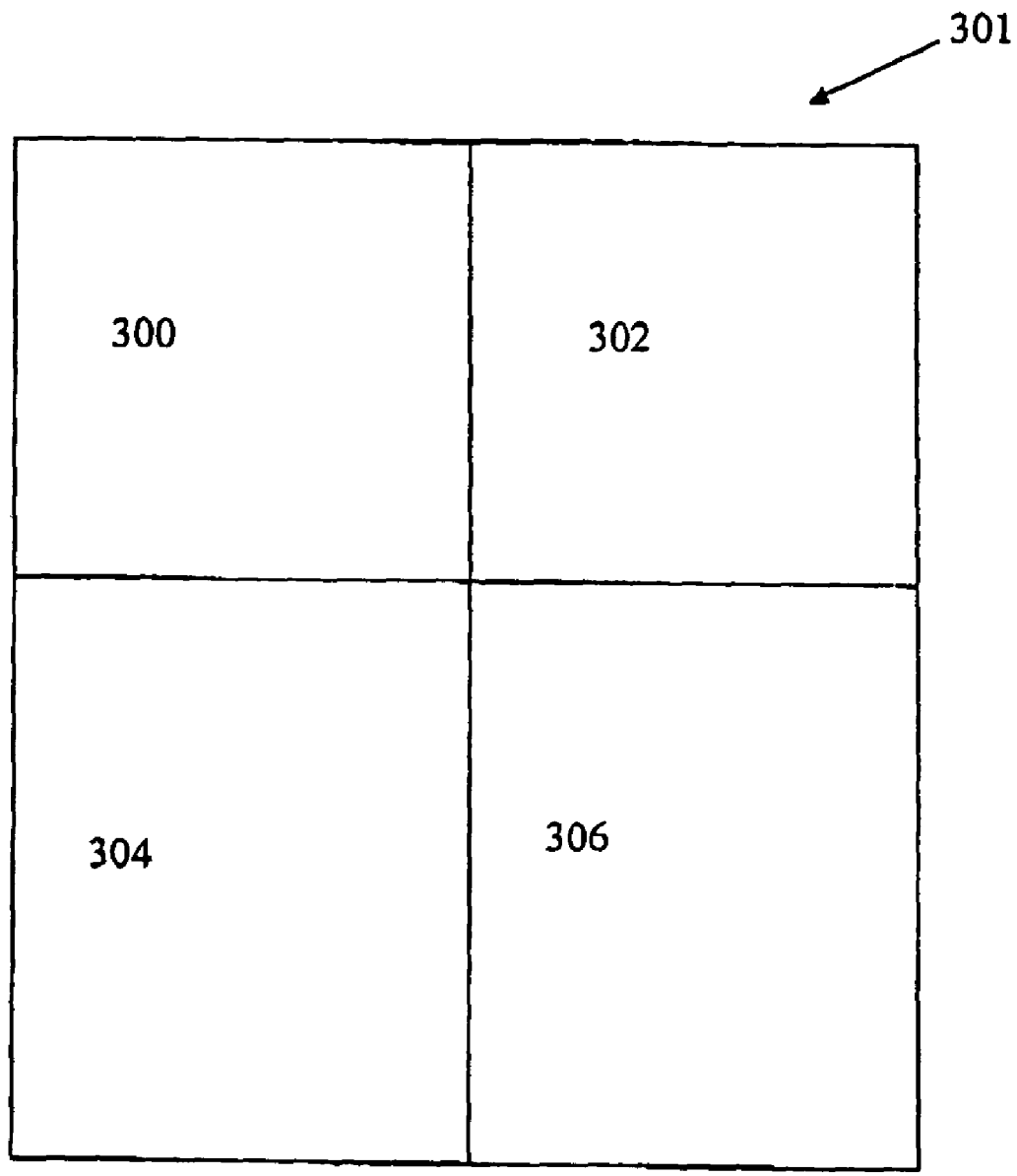
FIG. 3 is a block diagram of a component application package of FIG. 1.

Referring to FIG. 3, the application 105 packages have application elements or artifacts 301 such as but not limited to XML definitions 300, mappings 302, application resources 304, and optionally resource bundle(s) 306 for localization support. XML definitions 300 are XML coding of application data 400, messages 404, screens 402 components and workflow 406, part of the raw application 105. The contents of the application 105 packages are accessed by the tool 116 as input for the generation of the definitions (e.g. XML) of the service interface 107. It is recognised that XML syntax is used only as an example of any structured definition language applicable to coding of the applications 105 as well. For example, it is understood that the application 105 and the interface 107 definitions may be in dissimilar structure definition languages. Application mapping 302 defines the relationship of content in the application messaging to backend operation of the data sources 106. The application developer creates the mappings 302 using the tool 116, whereby the gateway AG utilizes this mapping 302 information during communication of the application 105 request/response messages between the run time RE, of the devices 100, and the data sources 106. The resources 304 are one or more resources (images, sound bytes, media, etc . . . ) that are packaged with the application 105 as static dependencies. For example, resources 304 can be located relative to a resources folder (not shown) such that a particular resource may contain its own relative path to the main folder (e.g. resources/icon.gif, resources/screens/clipart_1.0/happyface.gif, and resources/soundbytes/midi/inthemood.midi). The resource bundles 306 can contain localization information for each language supported by the application 105. These bundles can be located in a locate folder, for example, and can be named according to the language supported (e.g. locale/lang_en.properties and locale/lang_fr.properties). An example of the elements 301 is given below.

It is recognised that the runtime environment RE of the device 100 is the client-resident container within which the applications 105 are executed on the device 100. The container manages the application 105 lifecycle on the device 100 (provisioning, execution, deletion, etc.) and is responsible for translating the metadata (XML) representing the application 105 into an efficient executable form on the device 100. The application 105 metadata is the executable form of the XML definitions 300, as described above, and is created and maintained by the runtime environment RE. The RE can provide a set of common services to the application 105, as well as providing support for optional JavaScript or other scripting languages. These services include support for such as but not limited to UI control, data persistence and asynchronous client-server messaging. It is recognised that these services could also be incorporated as part of the application 105, if desired. The persistence service of the RE can allow the component application programs 105 to store data in the memory module of the device 100. It is recognised the persistence service of the RE can be used to coordinate the modification/creation of data instances of the data components 400 linked to the message components 404 via the inter-component mappings 800 (see FIG. 6a).

Figure 4:
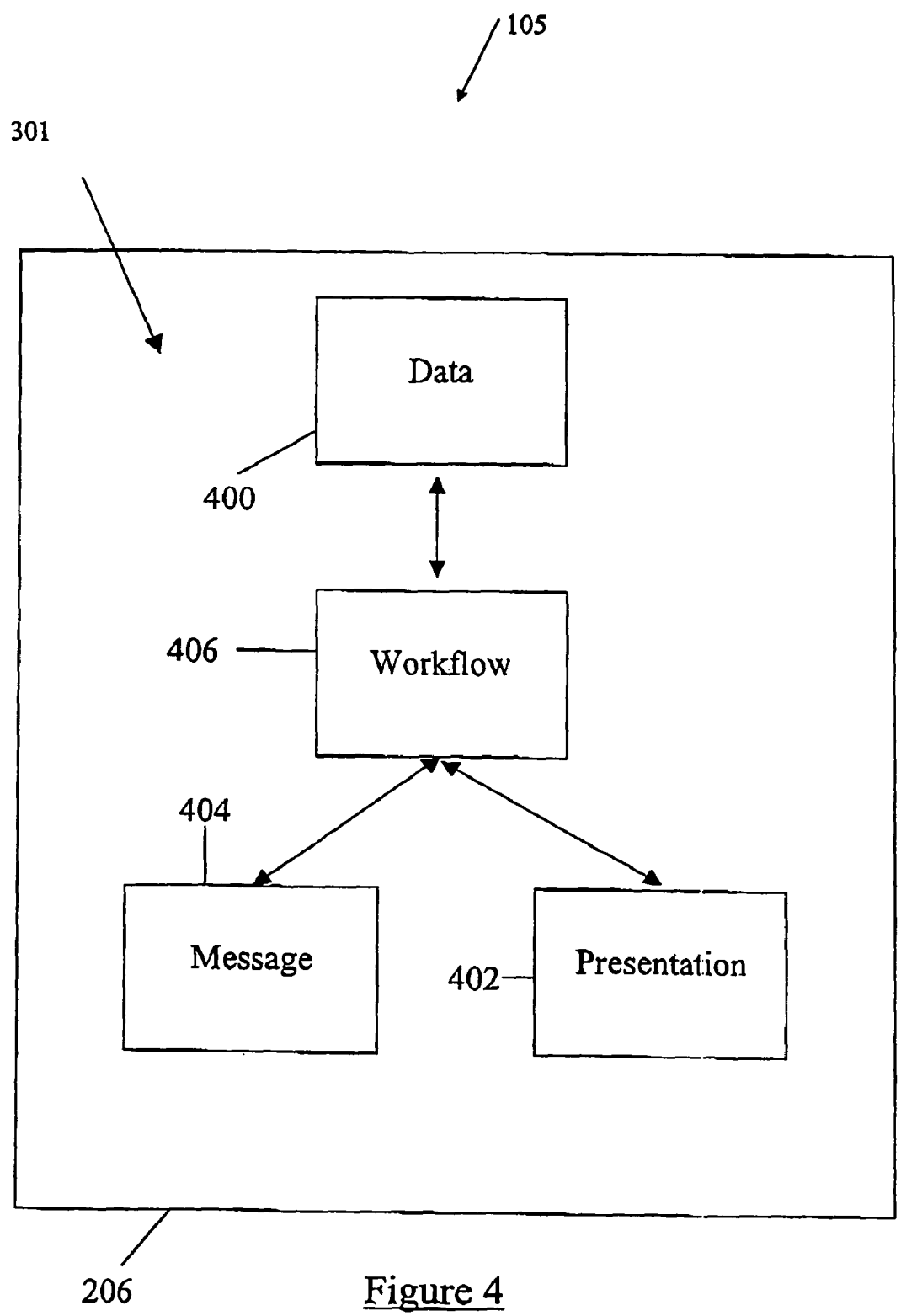
FIG. 4 is a block diagram illustrating example components of the application of FIG. 3.

Referring to FIG. 4, the component applications 105 (or a portion thereof—for example the screen 402 and data 400 components) used to construct the interface 107 are software applications which can have artifacts 301 written, for example, in eXtensible Markup Language (XML) and a subset of ECMAScript. XML and ECMAScript are standards-based languages that allow software developers to develop the component applications 105 in a portable and platform-independent way. A block diagram of the component application 105 comprises the data components 400, the presentation components 402 and the message components 404, which are coordinated by workflow components 406 through interaction with the client runtime environment RE of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (EMS), and Australian Government Locator Service (AGLS). Encoding syntax allows the metadata of the components 400, 402, 404 to be processed by the runtime environment RE (see FIG. 1), and encoding schemes include schemes such as but not limited to XML, HTML, XHTML, XSML, RDF, Machine Readable Cataloging (MARC), and Multipurpose Internet Mail Extensions (MIME). The client runtime environment RE of the device 100 operates on the metadata descriptors of the components 400, 402, 404 to provision an executable version of the application 105.

Referring again to FIG. 4, the data components 400 define data entities which are used by the component application 105. Data components 400 define what information is required to describe the data entities, and in what format the information is expressed. For example, the data component 400 may define information such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400. It is recognised that the message components 404 can be linked via the mappings 800 to the data components 400 (see FIG. 19a), as further described below.

Referring again to FIG. 4, the message components 404 define the format of messages used by the component application 105 to communicate with external systems such as the web service. For example, one of the message components 404 may describe information such as but not limited to a message for placing an order which includes the unique identifier for the order, the status of the order, and notes associated with the order. It is recognised that data definition content of the components can be shared (e.g. through mappings 800) for data 400 and message 404 components that are linked or otherwise contain similar data definitions.

Referring again to FIG. 4, the presentation components 402 define the appearance and behavior of the component application 105 as it displayed by a user interface of the devices 100. The presentation components 402 can specify GUI screens and controls, and actions to be executed when the user interacts with the component application 105 using the user interface. For example, the presentation components 402 may define screens, labels, edit boxes, buttons and menus, and actions to be taken when the user types in an edit box or pushes a button. It is recognised that data definition content of the components can be shared for data 400 and presentation 402 components that are linked or otherwise contain similar data definitions.

Referring to FIGS. 1 and 4, it is recognized that in the above described client component application 105 definitions hosting model, the presentation components 402 may vary depending on the client platform and environment of the device 100. For example, in some cases Web Service consumers do not require a visual presentation. The application definition of the components 400, 402, 404, 406 of the component application 105 can be hosted in the Web Service repository 114 as a package bundle of platform-neutral data 400, message 404, workflow 406 component descriptors with a set of platform-specific presentation component 402 descriptors for various predefined client runtimes RE. When the discovery or deployment request message for the application 105 is issued, the client type would be specified as a part of this request message. In order not to duplicate data, message, and workflow metadata while packaging component application 105 for different client platforms of the communication devices 100, application definitions can be hosted as a bundle of platform-neutral component definitions linked with different sets of presentation components 402. For those Web Service consumers, the client application 105 would contain selected presentation components 402 linked with the data 400 and message 404 components through the workflow components 406.

Referring again to FIG. 4, the workflow components 406 of the component application 105 define processing that occurs when an action is to be performed, such as an action specified by a presentation component 402 as described above, or an action to be performed when messages arrive from the application gateway AG (see FIG. 1). Presentation, workflow and message processing are defined by the workflow components 406. The workflow components 406 are written as a series of instructions in a programming language (e.g. object oriented programming language) and/or a scripting language, such as but not limited to ECMAScript, and can be (for example) compiled into native code and executed by the runtime environment 206, as described above. An example of the workflow components 406 may be to assign values to data, manipulate screens, or send the message 105. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100.

Referring to FIG. 4, the application 105 is structured using component architecture such that when the device 100 (see FIG. 1) receives a response message from the application gateway AG containing message data, the appropriate workflow component 406 interprets the data content of the message according to the appropriate message component 404 definitions. The workflow component 406 then processes the data content and inserts the data into the corresponding data component 400 for subsequent storage in the device 100. Further, if needed, the workflow component 406 also inserts the data into the appropriate presentation component 402 for subsequent display on the display of the device 100. A further example of the component architecture of the applications 105 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, via the interface 107, as defined by the message component 404.

It is recognised that a Web Services client application 105 could be expressed using a structured definition language, such as but not limited to XML, and a platform neutral scripting/programming language, such as but not limited to ECMAScript, with defined components conforming with an appropriate Document Type Definition (DTD). further, it is recognised that the script of the application 105 could be stored in a separate document.

Figure 5:
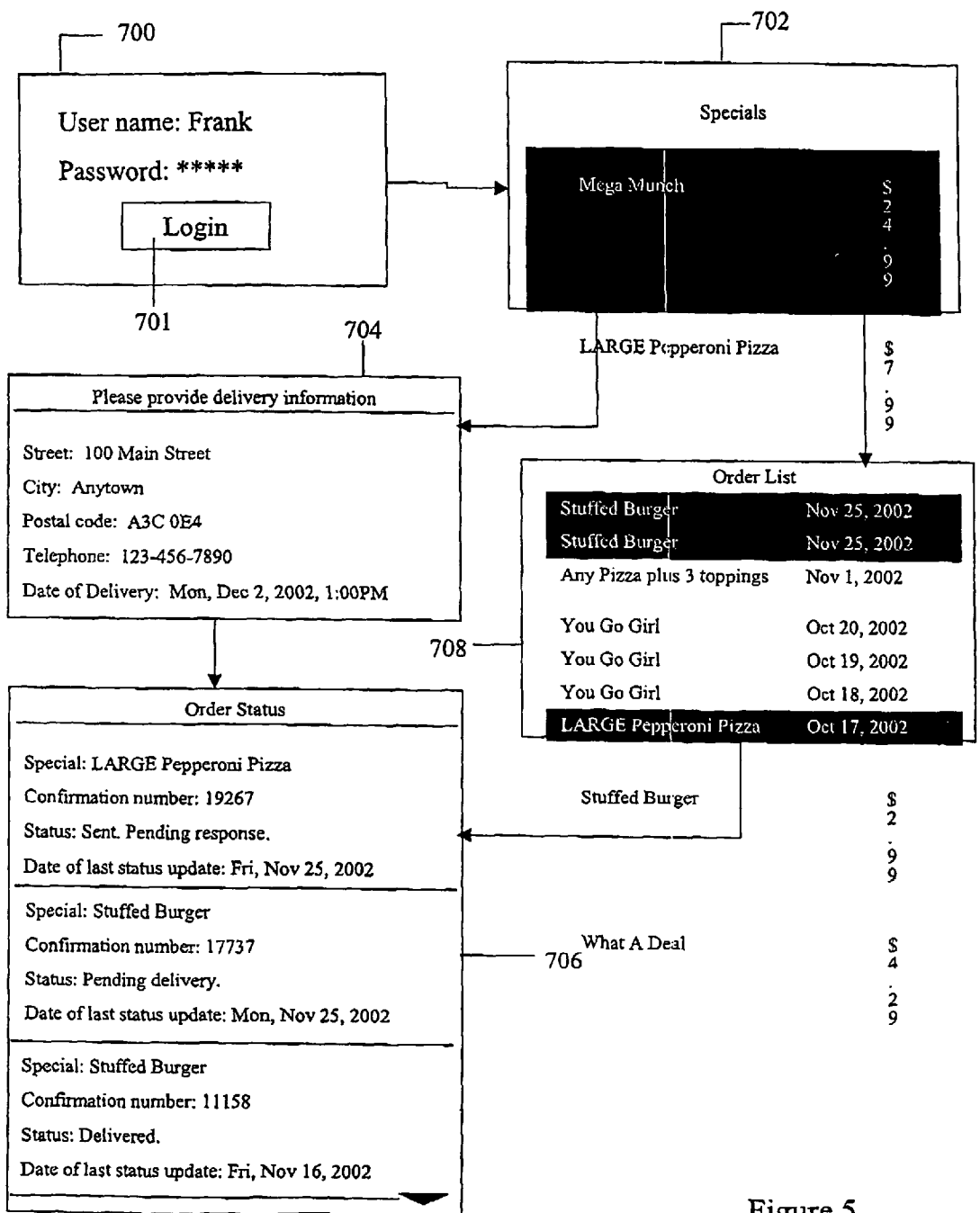
FIG. 5 shows example screens and workflow for a sample component application of FIG. 3.

The example component application program 105 displayed in FIG. 5 is represented in XML and ECMAScript as follows, including data components 400 as "wcData", message components 404 as "wcMsg", presentation components 402 as "wcScr" and workflow components 406 as "wcFlow" for processing the other components 400, 402, 404:

```
<!DOCTYPE wcApp SYSTEM "wcApp.dtd">
<wcApp name="WirelessPizza" title="Wireless Pizza" vendor="ARG" version="0.9">
    <desc> Order pizza from your wireless device. </desc>
    <iconUrl>http://www.example.com/wirelessPizzaIcon.png</iconUrl>
    <wcData name="User">
        <dfield name="name" type="String" key="1"/>
        <dfield name="passwordHash" type="String"/>
        <dfield name="street" type="String"/>
        <dfield name="city" type="String"/>
        <dfield name="postal" type="String"/>
        <dfield name="phone" type="String"/>
    </wcData>
    <wcData name="OrderStatus">
        <dfield name="confNumber" type="Number" key="1"/>
        <dfield name="status" type="String"/>
        <dfield name="datetime" type="Date"/>
    </wcData>
    <wcData name="Order">
        <dfield name="orderId" type="Number" key="1"/>
        <dfield name="special" type="String"/>
        <dfield name="user" cmp="true" cmpName="User"/>
        <dfield name="datetime" type="Date"/>
        <dfield name="orderStatus" cmp="true" cmpName="OrderStatus"/>
    </wcData>
    <wcData name="Special">
        <dfield name="desc" key="1" type="String"/>
        <dfield name="price" type="Number"/>
    </wcData>
    <wcMsg name="inAddSpecial" mapping="Special">
    </wcMsg>
    <wcMsg name="inRemoveSpecial" pblock="mnRemoveSpecial">
        <mfield name="desc" mapping="Special.desc"/>
    </wcMsg>
    <wcMsg name="inOrderStatus">
```

-continued

```
      <mfield name="orderId" mapping="Order.orderId"/>
      <mfield name="status" mapping="Order.orderStatus"/>
  </wcMsg>
  <wcMsg name="inUserInfo" mapping="User">
  </wcMsg>
  <wcMsg name="outOrder">
      <mfield name="special" mapping="Order.special"/>
      <mfield name="user" mapping="Order.user"/>
      <mfield name="datetime" mapping="Order.datetime"/>
  </wcMsg>
  <wcScr name="scrSpecials" title="Specials" main="true">
      <layout type="flow">
         <choice name="slSpecials" value="Special[].desc + '- $' + Special[].price" type="singleList"/>
      </layout>
      <menu>
         <item name="login" label="Login">
             <action screen="scrLogin"/>
             <condition pblock="chLoggedin" result="false"/>
         </item>
         <item name="order" label="Order">
             <action screen="scrDelivery" param="Application.authenticatedUser"/>
             <condition pblock="chLoggedin"/>
         </item>
         <item name="viewOrderStatus" label="View Orders Status">
             <action screen="scrOrdersList"/>
             <condition pblock="chLoggedin"/>
         </item>
      </menu>
  </wcScr>
  <wcScr name="scrLogin" dialog="true">
     <layout type="vertical">
        <layout type="flow">
           <label name="lblUserName" value="User Name:"/>
           <edit name="edUserName" type="char"/>
        </layout>
        <layout type="flow">
           <label name="lblPassword" value="Password:"/>
           <edit name="edPassword" type="pwd"/>
        </layout>
        <button name="btnLogin" label="Login">
           <event type="onClick" pblock="ahLogin" param="edUserName.value"/>
        </button>
     </layout>
  </wcScr>
  <wcScr name="scrDelivery" title="Please provide delivery information" param="User">
     <layout type="vertical">
        <layout type="flow">
           <label name="lblStreet" value="Street:"/>
           <edit name="street" mapping="User.street" type="char"/>
        </layout>
        <layout type="flow">
           <label name="lblCity" value="City:"/>
           <edit name="city" mapping="User.city" type="char"/>
        </layout>
        <layout type="flow">
           <label name="lblPostalCode" value="Postal code:"/>
           <edit name="postalCode" mapping="User.postal" type="char"/>
        </layout>
        <layout type="flow">
           <label name="lblPhone" value="Telephone:"/>
           <edit name="phone" mapping="User.phone" type="phone"/>
        </layout>
        <layout type="flow">
           <label name="lblDate" value="Date of delivery:"/>
           <edit name="date" type="date"/>
        </layout>
     </layout>
     <menu>
        <item name="sendOrder" label="Send Order">
           <action pblock="ahSendOrder" param="User"/>
        </item>
     </menu>
  </wcScr>
  <wcScr name="scrOrderstatus" title="Order status" param="Order[]">
     <layout type="vertical" param="%">
        <layout type="flow">
           <label name="lblSpecialr" value="Special:"/>
           <label name="lblSpecialMapped" value="@Order[].special"/>
```

-continued

```
        </layout>
        <layout type="flow">
            <label name="lblConfNumber" value="Confirmation number:"/>
            <label name="lblConfNumberMapped"
value="@Order[].orderStatus.confNumber"/>
        </layout>
        <layout type="flow">
            <label name="lblStatus" value="Status:"/>
            <label name="lblStatusMapped" value="@Order[].orderStatus.status"/>
        </layout>
        <layout type="flow">
            <label name="lblConfDate" value="Date of last status update:"/>
            <label name="lblConfDateMapped"
value="@Order[].orderStatus.datetime"/>
        </layout>
        <separator/>
    </layout>
    <menu>
        <item name="continue" label="Continue">
            <action screen="scrSpecials"/>
        </item>
    </menu>
    <refresh>
        <msg> inOrderStatus </msg>
    </refresh>
</wcScr>
<wcScr name="scrOrdersList" titie="Previous Orders">
    <layout type="vertical">
        <label name="lblInstructlons" value="Select one or more order:"/>
        <choice name="mlOrderList" value="@Order[].datetime + '-' + @Order[].special"
mapping="Order[]" type="multiList"/>
    </layout>
    <menu>
        <item name="viewOrder" label="View Order">
            <action screen="scrOrderStatus" param="mlOrderList.selected"/>
        </item>
    </menu>
</wcScr>
<wcFlow>
    <pblock id="chLoggedin">
        return Application.authenticatedUSer != null;
    </pblock>
    <pblock id="ahLogin" param="User.name">
        if(User.passwordHash == Util.md5(scrLogin.edPassword) ) {
            Application.authenticatedUser = User;
            scrLogin.back( );
        } else {
        Dialog.display("Invalid login!"):
        }
    </pblock>
    <pblock id="ahSendOrder" param="User">
        Order.orderId = Util.guid( );
        Order.special = scrSpecials.slSpecials.selected;
        Order.user = User;
        Order.datetime = scrDelivery.date;
        OrderStatus.confNumber = Util.guid( );
        OrderStatus.status = "Sent. Pending response.";
        OrderStatus.date = Util.currentDate( );
        Order.orderStatus = OrderStatus;
        outOrder.send( );
        scrOrderstatus.display(Order);
    </pblock>
    <pblock id="mhRemoveSpecial" param="inRemoveSpecial">
        Special.desc = inRemoveSpecial.desc;
        Special.delete( );
    </pblock>
</wcFlow>
</wcApp>
```

As given above, the XML elements define the example component application 105 including a wcApp element, a wcData element, a wcMsg element, a wcSrc element, and a wcFlow element. Referring to FIG. 4, the wcApp element is a top-level element which defines the component application 105. The wcData element defines the example data component 400, which is comprised of a group of named, typed fields. The wcMsg element defines the example message component 404, which similarly defines a group of named, typed fields. The wcSrc element defines the example presentation component 402. The example presentation component 402 is a label, a separator, an image, a button, an edit field, a text area, a single-selection list, a multi-selection list, a drop-list, a checkbox, a radio button, or a screen containing a group of other presentation components 402. The presentation components 402 included in the example component application 105 define a login screen 700, a specials screen 702, a delivery information screen 704, an order list screen 708, and an order status screen 706. These screens would be presented on the user interface of the device 100. As further described below, the control mappings of the screen component 402 are used in generation of the service interface 107. The wcFlow element defines the example workflow components 406. The pblock attributes of the XML elements specify a pblock element nested in the wcFlow element. Each pblock element comprises script which defines part of the workflow of the component application 105. The script is written in ECMAScript by way of example only.

In order to define the behavior of the component application 105, the workflow components 406 use ECMAScript to reference and manipulate the data components 400, the presentation components 402, and the message components 404. Workflow components 406 can also reference external object types, which allow actions to be performed on the components defined in the component application 105. For example, a wcMsg type allows a message defined by a message component 404 to be evaluated to determine whether mandatory fields have been supplied, and to be sent to an external system such as the web service 106. A wcData type allows the size of collections of data entities defined by data components 400 to be determined, and allows data entities to be deleted. A wcScr type allows a presentation component 402 to be displayed to the user. Similarly, a special dialog external object allows a message to be displayed to the user on the user interface of the device 100. The message components 404 relay the required data for the input and output of the messages of the application 105. The corresponding data components 400 coordinate the storage of the data in memory of the device 100 for subsequent presentation on the user interface by the presentation components 402. The workflow components 406 coordinate the transfer of data between the data 400, presentation 402, and message 404 components. The workflow components 406 are written as a series of instructions, such as but not limited to ECMAScript, which is described above.

The above described component based application 105 architecture can result in component applications 105 in which the user-interface of the device 100 and the definition of the data are decoupled. This decoupling allows for modification of any component 400, 402, 404, 406 in the component application 105 while facilitating insubstantial changes to other components 400, 402, 404, 406 in the application 105, and thus can facilitate maintenance of the component applications 105, including modification and updating of the component applications 105 on the device 100.

Mappings Between Data 400 and Message 404 Component Fields

The message 404 component contents and associated data 400 component contents can contain simple and/or complex data structures. Complex data structures can contain many levels of nesting (e.g. multidimensional data structures comprising nested arrays). Typical complex data structures can include the array, the stack, the list, the tree, and also "classes, for example, used to represent the physical and/or logical relationships among data elements of the structure for supporting support specific data manipulation functions. As an alternative embodiment, a linked list can represent a complex data structure by a sequential collection of structures, connected or "linked" by pointers. Linked lists can be more flexible than arrays for holding lists of items. The linked list can grow as necessary while the array can be limited to the fixed number of elements initially declared. The pointer contains a memory address of a variable; the variable contains a specific value. It is recognised that the array data structure can be different from the linked list data structure because the programmer deals only with the array positions and the computer bides all memory aspects. With linked lists, on the other hand, the programmer deals with some memory aspects—pointers. Thus, the linked list data structure, by its very nature, can have a physical aspect beyond the logical: memory address manipulation, by pointers. It is recognised that the above examples can be considered example descriptions of complex data structures. The wireless application message 404 content may have data fields of complex types, which have fields of type enumeration or simple/complex type, etc, which would be represented in the data 400 content.

As described above with reference to FIG. 4, the wireless component applications 105 are expressed as a collection of message 404, data 400 and components 402, 406, including information that specifies how these components interact. The application 105 is expressed using a structured definition language such as XML. It is noted that the expression of both messages 404 and data 400 as components can bear certain similarities:

each component 400, 404 is identified by a unique name; and each component 400, 404 specifies one or more subfields consisting of name and declared type.

In practice, typically the expression of the components 400, 404 by the developer can be almost identical, while the behaviour of each of the components 400, 404 of the application 105 is distinct. Therefore, by recognizing the fact that message 105 (see FIG. 1) content is often generated from some underlying data element, and in light of the similarities between expression of these components 400, 404, it is convenient to introduce certain mappings 800 (see FIG. 19*a*) to the expression of message components 404, as further described below. These mappings 800 are essentially shortcuts to the expression of the message 105 that specify how the message's definition is obtained regarding the message component 404, and how the message component 404 behaves at runtime during execution of the application 105. The mapping 800 is a stated relationship between the message component 404 definition and the data component 400 definition. In relation to expression of the message component 404, using the mapping 800 can reduce the amount of metadata required to describe the component 404. Thus use of the mapping 800 can have a direct effect on the amount of "code" (e.g. XML) required to describe the application 10. In relation to how the component 404 behaves at runtime, the mapping 800 specifies how linked data elements (described by the data component 400) are resolved and affected by message state. In this regard, specifying the mapping 800 can reduce the need for the developer to provide additional specific message handling code in the application 105.

Mapping Resolution Contract

Referring again to FIGS. 1 and 6*a*, the application and corresponding RE services rely upon a mapping resolution contract or mapping rule having a unique identifier 802 (see FIG. 6*a*). This mapping rule states that any mapping 800 attached to the data component 400 will map exactly one key field 802 per mapped data type 804. This mapping rule provides for unique identification and modification of the data instance affected by the mapping 800. The mapping rule states that the mapping 800 isolates an instance of the data component 400 to which the message content of the corresponding message component 404 is linked. Data component 400 instances are resolved by the unique identifier 802 (e.g. a key). It is noted that the composition of this identifier 802 could be such as but not limited to a simple primary key or a composite key arising from more than one field. A single field 804 (such as a component name) in the Data definition of the data component 400 is identified as referenced by this identifier 802. The mapping resolution contract provides that exactly one primary key field 802 is involved in the mapping 800 to each linked data component 400. This one to one property of the mapping 800 provides for the unique the resolution of data instances to which incoming message data applies, as further described below. A particular data instance is represented as a selected data component 400 that is assigned data values to each of the field names 808. A message instance 806 is represented as a selected message component 404 that is assigned data values to contained message field(s) through the mappings 800.

Two types of mappings 800 are described: field level mappings 911, and message level mappings 801. The following elaborates on how message 404 to data 400 component mappings 800 may be expressed, and specify a runtime resolution contract that exists to determine uniquely where message content is to be applied.

Message Level Mappings 801

Referring again to FIG. 6a, the Message level Mapping 801 is a mapping 800 from the message component 404 directly to the named data component 400 definition, such that message 806 field properties (message instance) are identical to those on the mapped data component. Message level mappings 801 state that the message instance 806 derives its complete specification from the linked data element of the data component 400. All fields described in the linked data component 400 will be present in the message instance 806, observing both field names 808, type declarations 810 and field order. For example, this type of message level mapping 801 can be convenient when the incoming or outgoing message instances 806 exactly duplicate the information represented by the data instance of the data component 400. Referring to FIG. 6b, a sample message level mapping 801 between the Order data component 400 and the submitOrder message component 404 is illustrated. The mapping resolution contract for the mapping 801 is satisfied by the implicit linking of orderId primary key field 802. A sample structured definition language description (e.g. f) of this relationship is provided in FIG. 6b. It is apparent from the XML expression that the size of the application 105 definition (see FIG. 4) can be reduced by introducing this mapping 801, as the listing of arguments 812 of the data component 400 is not repeated in the linked message component 404.

Field Level Mappings 911

The Field level Mapping 911 (see FIGS. 7a, 7b) provides a mapping 800 from a particular field 914 of the message component 404 definition to the named field 808 of the named data component 400 definition. Field level mappings 911 may arise where a more flexible arrangement of mappings 800 is required. In this configuration, each field mapping 911 specifies a linkage between each selected field 914 of the message instance 916 and the field 808 of the data instance corresponding to the data component 400. There may be any number of such field mappings 911. Field mappings 911 may involve only one target data component 400 (one-to-one linkage) or multiple data components 400 may be linked to the message instance 916 through separate field mappings 911 (one-to-many linkage). In order to satisfy the mapping resolution contract, the key field 802 is included for every data component 400 that is linked to the message component 404.

Referring to FIG. 7a, one-to-one mapping 911 arrangements incorporate a link to a single data component 400. One field mapping 911 is made to the field representing the primary key 802 of the data component 400, thus linking the message instance 916 with the data instance of the data component 400. Other mappings 911 are made between the selected message fields 914 of the component 404 and corresponding data fields 808 of the component 400. FIG. 7a depicts a typical field level mapping 911 relationship where a subset of the Part fields 808 are linked to the priceReduction message field 914. The mapping resolution contract is satisfied by making the link 911 to the partNo field which is identified as the key field 802 of Part. A sample XML expression for these relationships is provided in FIG. 7b, where Key field mapping 911 is shown in bold. It is recognised that the message instance 916 can have more than one message field 914, each mapped 911 to a respective data field 808 under the same key 802 (i.e. the message component 404 can be linked to two or more data fields 808 of the data component 400 using the same key 802).

Complex Mappings 1001

Referring to FIGS. 8a and 8b, a complex mapping 1001 arrangement consists of field level mappings 911 to two or more data components 400. As with the one-to-one mapping case of FIGS. 6a,b, different unique ones of the primary key field 802 mapping is provided for every data component 400 linked through the set of field mappings 911. FIG. 8b shows an XML representation of the relationships between the orderUpdate message 404 and the Order and Inventory data components 400. For each of the two data components 400 linked, a respective primary field mapping 911 with keys 802 is in place; orderId field key 802 for Order 400 and partNo field key 802 for Inventory 400. This satisfies the mapping resolution contract. These primary key field mappings 911 are shown in bold.

In view of the examples shown in FIGS. 6a,b, 7a,b, and 8a,b, other mapping 800 configurations is possible. Examples of such include such as but not limited to Extended Definition, Message Prototyping, and Arrival Event Processing, as further described below. Further, it is recognised that these mappings 800 could also be used to describe the definitions of the interface 107, as further detailed below.

An Extended Definition is a message component 404 that extends the message 801 or field mapping 911 configurations by defining additional un-mapped fields 914. This extended message instance 916 may extend its definition, in the presence of mappings 801, 911, by adding fields 914 that are not mapped to a respective data component 400 but rather complete their own specification within the message component definition 404. These fields 914 may be added to either the message 916 that has one or more field mappings 911, or the message 916 that is mapped 801 to a respective data component 400. Extended definition can provide an additional measure of flexibility to the specification of the mapped message 916. Message Prototyping can be defined as the ability to extend the stated definition of another message component 404. This mechanism has a similar effect as in object-oriented inheritance; all the declared fields 914 of the parent message 916 will be available to the extending message 916. With regard to mapping 801, 911 relationships, the extending message mappings 801,911 could override any mapping specifications stated on the parent message 916. For Message Arrival Event Processing, the mapping mechanism can be further enhanced by permitting the association of additional processing code to the message reception. The body of processing code can be identified through the specification of the message component 404 through application XML. The processing code may be a script (such as ECMAScript) embodied in the application 105 (e.g. a workflow component 406), or may identify a standard native transformation offered by the Device Runtime environment RE (see FIG. 1). Handling of message arrival event processing is further discussed below.

For the origination of message instances 916, the message to data mappings 801, 911 define the source and format for content that the message instance 916 will carry. The message format may be derived identically from the linked data component 400 (message mapping 801) or may be defined by the aggregate effect of multiple data component 400 relationships (field level mapping 911). Finally, some message fields can carry their own declarations (extended definition). In order to generate the originating message instance 916 that specifies either type of mapping 801, 911, all dependent data component 400 instances are supplied to the input of the message component generation process. In addition the use of the extended declaration of fields 914 implies that the supplied message instance 916 provides the necessary field value.

These mappings 801,911 affect how a Data Component 400 is populated on Message arrival to the device 100 when running the application 105. For example, data object definitions common between data 400 and message 404 components can be such that the data object definitions can be resident in the data component 400, while a only data mapping definition 801,911 (stating where the data object definition(s) can be found) linking the message component 404 to the data object definition in the data component 400 can be resident in the message component 404, or vice versa. A similar configuration can be employed for data object definitions common between screen 402 and data 400 components, whereby the data object definition is resident in one of the components and the data mapping definition 801,911 is resident in the other associated component.

Designer Tool 116 Architecture

Figure 9:
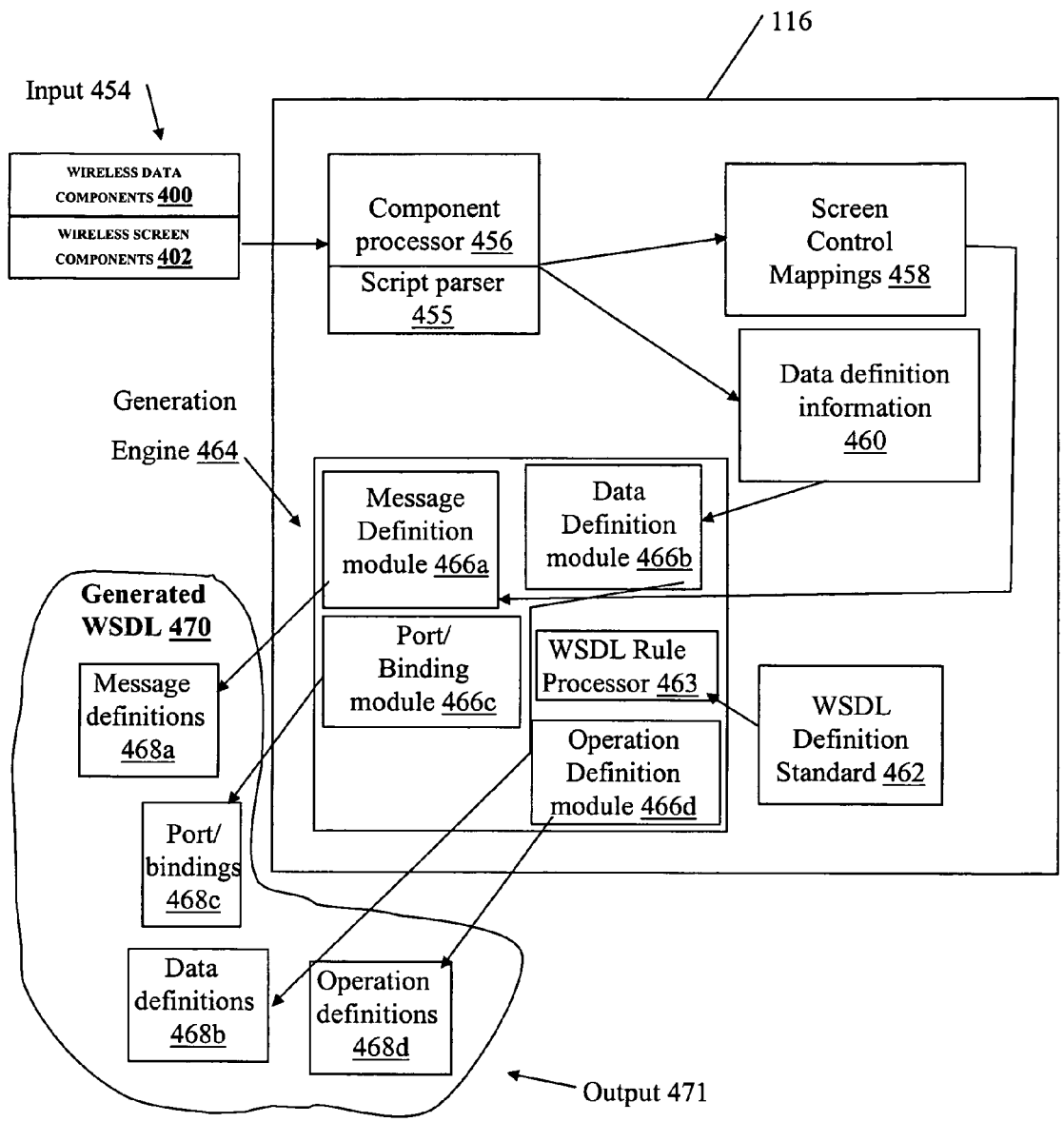
FIG. 9 is a further embodiment of the tool of FIG. 2.

Referring to FIG. 9, the tool 116 has an interface (e.g. WSDL) generation engine 464 for providing a methodology and system to automatically generate implementable interfaces 107 (i.e. output 471) from existing components 400,402 (i.e. input 454), including automatically generating WSDL 470 for enabling cooperation with the manipulation of complex type data parameters and associated messages in relation to the backend data source 106. The tool 116 provides automatic generation of the web service definition as the interface 107, using the screen (e.g. user interface) components 402 of the application 105 provided as part of the tool input 454. The generation of the interface 107 enables the developer to first design the application 105 from the user interface point of view and then generate the interface 107 of the complimentary backend data source 106. The developer can then implement the web service interface 107 on the data source 106 server (not shown) or give the web service definition interface 107 to another individual to implement. Additionally the tool 116 can be used to generate database table definitions 468a in DDL (for example) to help implement the server side of the web contract.

Figure 10:
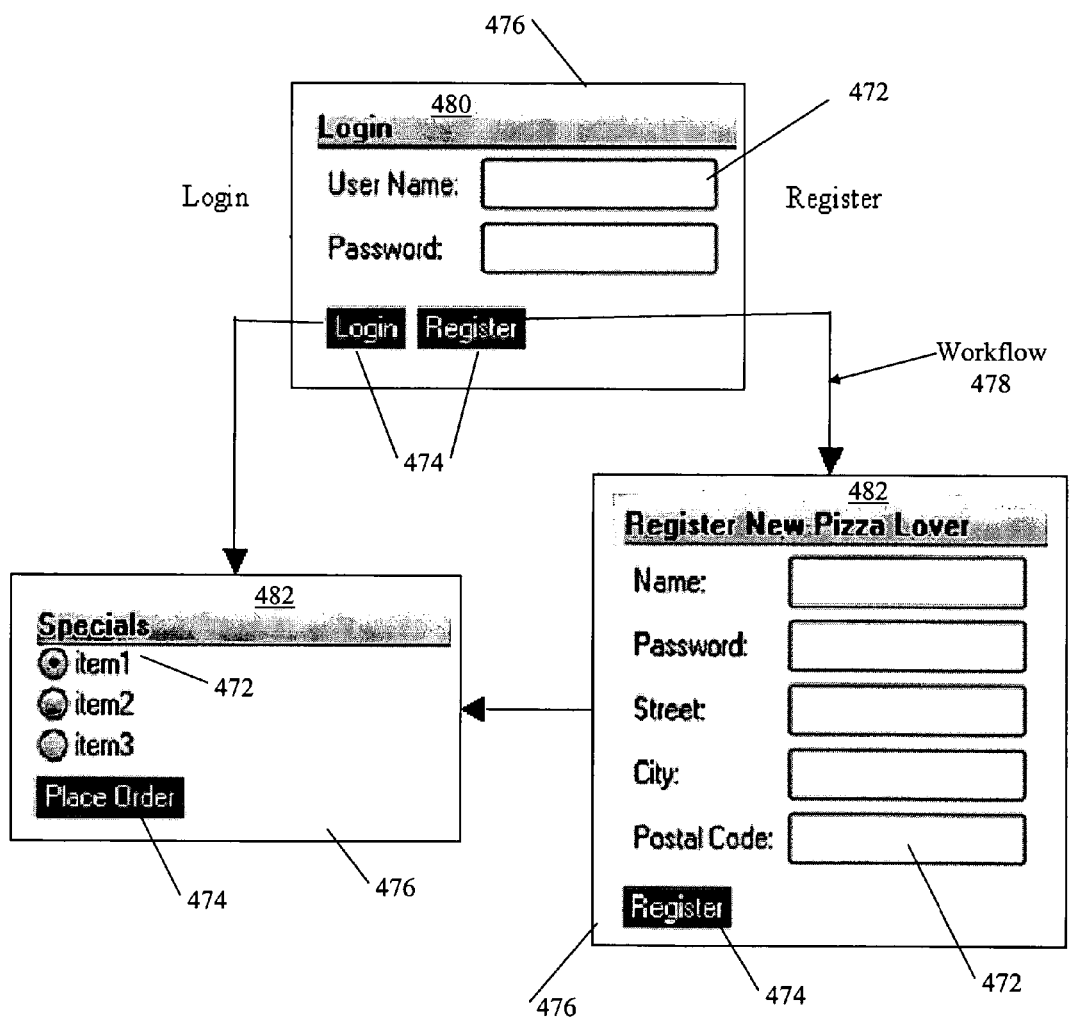
FIG. 10 shows an example workflow of the screens for representation by the service interface of FIG. 1.

Referring to FIGS. 9 and 10, the tool 116 generates the web service definition interface 107 from the work flow 478 of screen controls 322 in the wireless application definition (e.g. screen component 402). The tool 116 works by examining each screen 476 in turn and looks for transitions from one screen 476 to another. Each transition found by the generation engine 464 from the input 454 is used to generate a web service operation including message definitions 468a and optionally supporting data definitions 468b of the generated WSDL 470. The input 454 is operated on by a component processor 456, and optionally a script parser 455, to identify any output mappings 458, via the present screen transitions, from the controls 474 on a source screen 480. The output to the operation (message definitions 468a) is based on the input mappings 458 found on the controls 474 on a target screen 482. The component processor 456 does not have to use an XML parser, if desired, rather the application 105 definition can be represented as an object model for access by the tool 116 when saving the application 105 to disk or loading from disk. The component processor 456 would iterate through the screens in the application 105 definition model in memory 210.

Further, the script parser 455 is used to help identify the screen transitions representing the screen control mappings 458. For example if a selected screen 476 definition of the input 454 has a button or menuItem with an onClick event, the onClick event is examined. If the onClick event defines a transition to another screen 476 then we have found a screen transition. The source screen 480 is the current screen and the target screen 482 is the screen the event transitions to. If the onClick event defines a transition to a script, the component processor 456 could apply the parser 455 to the script contents to identify a call to another screen 476 (e.g. screenName.display( ) is such a call).

For example, screen controls such as edit box, text area, choice and repetition have a property called output mapping. This property indicates that when the user changes the control value, the value should be assigned to a global, local or parameter. For choice and repetition the change is a selection change. For an edit box or text area the change is a change to the text the control is editing. Using the Pizza application of FIG. 5 as an example, the Login screen has two edit boxes. The "User Name" edit box has the output control mapping 458 of "user.name" and the "Password" edit box has an output control mapping 458 of "user.password" where user is a local variable of type User and name and password are fields defined on the type User. From this information and the fact that the Login button passes the "user" local variable to the Specials screen, the processor 456 and/or script parser 455 can deduce that name and password are needed to make the transition. The processor 456 and/or script parser 455 considers each transition to require an operation. In the example so far the generation engine 464 would create a WSDL operation definition 468b named "Login" based on the name of the button obtained from the control mapping 458. The generation engine 464 would create a WSDL message definition 468a called LoginRequest consisting of two parts: "userName" and "password", based on the corresponding identified control mappings 458. The "userName" part would be of type string because the name field is a string in the application 105. The "password" part would be of type string because the password field is a string in the application 105.

The generation engine 464 would then look at the controls from the identified screen control mappings 458 in the Specials screen in order to build the response message definitions 468a. The Specials screen has a choice control and a button. The choice control has an initial value (aka input mapping) of "@Special[ ].desc". This means the choice should display a list of descriptions one for each Special in the application 105. From this information the processor 456 and/or script parser 455 deduces that the response should contain a list of specials and provides corresponding output control mappings 458. The generation engine 464 creates a WSDL message definition 468a named LoginResponse with a part called specials from these identified control mappings 458. The type of the part is ArrayOfSpecials. The generation engine 464 creates an XML-Schema type called ArrayOfSpecials to represent the list. The type has one element called specials of type string (because desc is of type string). The element is "unbounded" meaning it can repeat.

So given two screens 476 Login and Specials and a transition from Login to Specials:

```
screen Login
   user.name
   user.password
screen Specials(User user)
   @Special[ ].desc
``` we get the following example WSDL representing the generated WSDL 470:

```
<types>
   <xs:schema elementFormDefault="qualified"
         targetNamespace="http://new.webservice.namespace">
      <xs:complexType name="ArrayOfSpecials">
         <xs:sequence>
            <xs:element name="specials" type="xs:string" maxOccurs="unbounded"/>
         </xs:sequence>
      </xs:complexType>
   </xs:schema>
</types>
<message name="LoginRequest">
   <part name="userName" type="xs:string"/>
   <part name="password" type="xs:string"/>
</message>
<message name="LoginResponse">
   <part name="specials" type="y:ArrayOfSpecials"/>
</message>
<portType name ="typeName">
   <operation name="Login">
      <input message="y:LoginRequest"/>
      <output message="y:LoginResponse"/>
   </operation>
</portType>
```

Note all of the generated operations could live in the same portType of the interface 107, for example.

Referring again to FIG. 9, the processor 456 (and parser 455 where needed) are used by the tool 116 to identify mappings 458 and data definitions 460 from the input 454. The mappings 458 are used by the generation engine to create the output 471. For example, a message module 466a of the engine 464 (i.e. part of the overall WSDL generation algorithm implemented by the engine 464) can be used to generate the message definitions 468a Similarly, a data definition generator 466b uses the data definition information identified from the input (e.g. defined data for data fields 472 of the screens 476—see FIG. 10) to generate appropriate message definitions 468b as desired. Further, the engine 464 can also have a port/binding generator 466c used to generate any port/binding definitions 468c of the generated WSDL 470. Further, the engine 464 also has an operation definition generator 466d generating an operation definition 468d describing an action supported by the data source 106, as described above. It is noted that the generators 466a,b,c,d can also use a WSDL definition standard or template 462 to guide through a rule processor 463 the generation of the specific syntax and format of the definitions 468a,b,c,d, where appropriate. The developer can later decide either to deploy the generated interface 107 or to fine-tune it as needed. For example, it is understood that the tool 116 can communicate with other modules of the design environment during the interface 107 generation process in general, including modules such as but not limited to editors 600 and viewers 602. It is recognised that the association of these modules with the engine 464 can be performed in an iterative fashion with the developer during automatic generation of the WSDL 470 and/or once the WSDL 470 has been generated.

Further, it is recognised that the engine 464 could be configured such that the engine 464 wouldn't be broken up into discrete modules 468a,b,c,d for messages, data, port/binding and operations respectively. Rather, the generated WSDL 470 model would be created in memory 210 using a WSDL API to create the respective objects/definitions 468a,b,c,d. The engine 464 would most likely generate a SOAP binding definition 468c since this is currently the most common in practice.

Accordingly, it is recognised that the engine 464 can be integrated in the tool 116 architecture, or supplied as a separate tool, and utilizes existing (i.e. predefined) data 400, screen 402 components as input 454 to produce the output 471 (e.g. WSDL 470) out of the control mappings 458 and data structure discovered in the input 454. Accordingly, the tool 116 provides for the automatic or otherwise guided generation of the WSDL 470 used to define message and/or data structures used by the selected data source 106. further, it is recognised that each transition (i.e. identified control mappings 458 corresponds to a single operation. Each control of the source screen 480 with an output mapping is used to generate a field in the request message definition 468a. Each control of the target screen 482 with an initial value is used to generate a field in the response message definition 468a.

Figure 11:
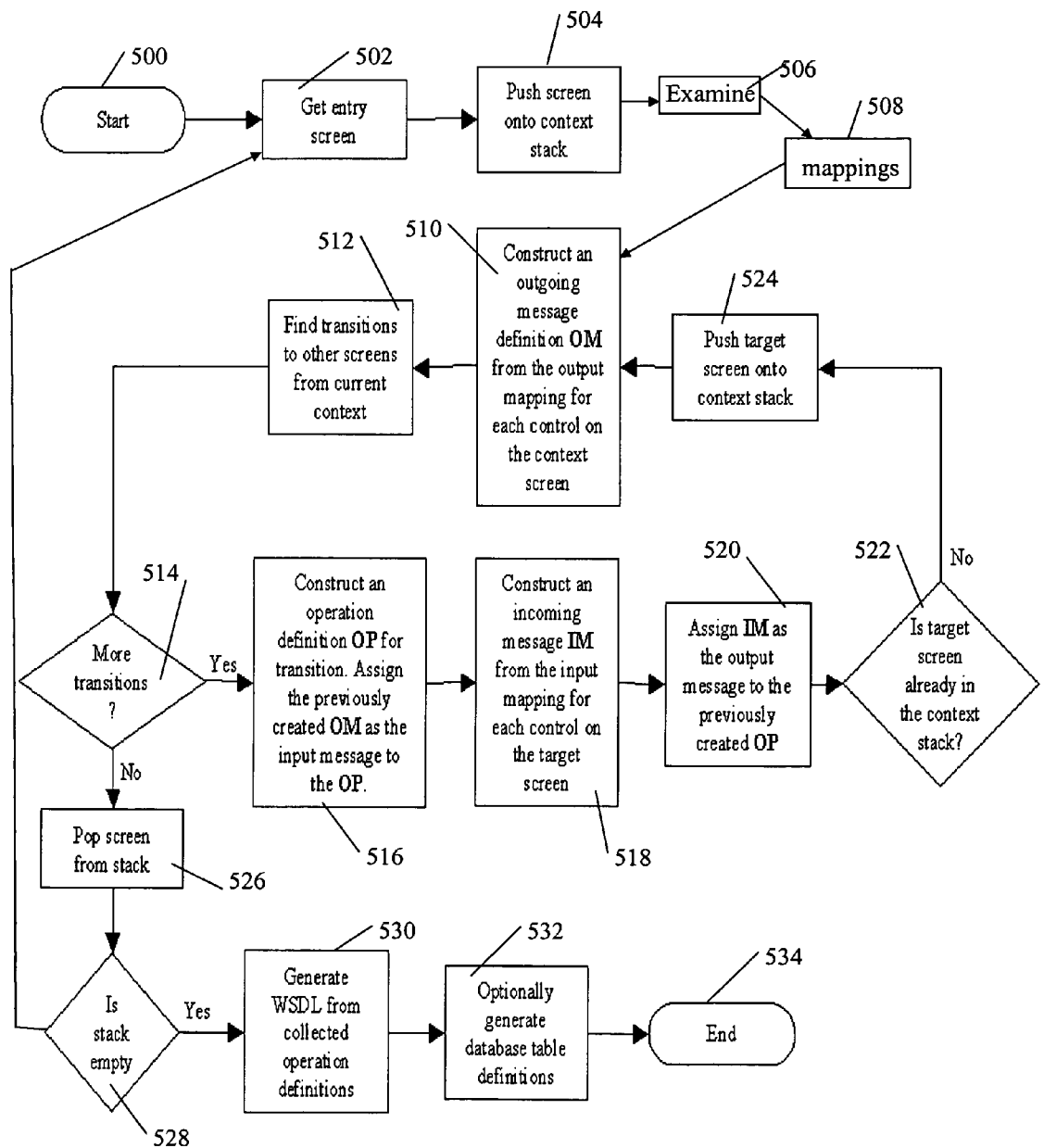
FIG. 11 is an example operation of the tool of FIG. 9.

The following FIG. 11 (along with FIG. 10) illustrates the web service operation generation algorithm 500 for producing the interface 107 as the generated WSDL 470, for example. The algorithm 500 starts by creating 501 a context stack (i.e. the screen components can be processed in an ordered fashion based on their position in the work flow 478, for example, —see FIG. 10). The entry screen 480 is selected 502 from the definitions of the application 105 and is pushed 504 onto the context stack. The representative screen component 402 on the top of the stack is examined 506 by the processor 456 in order to identify 508 the mappings 458. If the screen component 402 on the top of the stack contains transitions (i.e. control mappings 458) to other screens 476, the algorithm 500 proceeds to start the generation of a corresponding web service operation for the output 471. The controls 474 of the context screen 480 are examined at step 510 along with other transitions at step 512. For each 514 of the identified transitions of the mappings 458, each control 474 with an output mapping 458 is used to construct the outgoing message definition 468a (for example by the message definition module 466a) from the output mapping 458 for each corresponding control 474 of the screen component 402. The operation definition 468d for the transition is then constructed 516 (for example by the operation definition module 466d) and the previously created output message definition 468a is assigned as the input message of the web service operation 468d (i.e. input message definitions 468a), including adding message fields. The type of the field is derived from the type of the output mapping 458. An incoming message definition 468a from the input mappings 458 for each control 474 of the target screen 482 is then constructed 518, such that the controls 474 of the target screen 482 are examined. Each control 474 with the input mapping 458 is then assigned 520 as the output message definition 468a to the previously created operation 468d, including adding message fields to the output message of the web service operation 468d. The type of the field is derived from the type of the input mapping 458. Further transitions are searched for in the identified mappings 458 of the current screen component 402. Optionally, the operation definitions 468d and the message definitions 468a syntax/format can be guided through the application of the known definition standard templates/patterns 462 via the processor 463.

Once the operation 468d has been generated from the current transition a check 522 is made to see if the target screen 482 of the current transition is already on the stack. If the target screen 482 is already on the stack that means it is already being processed. If the target screen 482 is not on the stack it is pushed 524 on the stack and examined for transitions and handled as described above.

When all the transitions for the screen on the top of the stack have been processed, the screen component 402 is popped 526 from the stack and processing continues at step 502 with the new screen component 402 (e.g. respective mappings 458 as identified by the processor 456) at the top of the stack. When all of the screen components 402 have been popped from the stack and the stack is empty 528 a web service document 470 is generated 530 from the collected operations 468d and message 468a definitions. As an optional step 532 the algorithm 500 can generate, via the module 466b, database table definitions 468b (by the data definition module 466b) in a data definition language (DDL) by matching the message definitions 468a used in the generated WSDL operations and then the algorithm stops 534. It is recognised that the message mappings 801,911 described above can be used to help link the appropriate data definitions 468b to the message definitions 468a. Further, the port/binding module 466c can also be used to generate the appropriate port/binding definitions 468c in view of the message definitions 468a and optional data definitions 468b.

Message definitions 468a are generated for each control 474 of the screen component 402. For example, clicking on the register control 474 by the device 100 user sends the control to the target screen 482. It is recognized that the incoming and outgoing message screens can have for example controls 474 of the following non-array types, such as but not limited to:

wireless enumerations: exclusive choice controls (format dropdown);

strings: edit box (format text);

boolean: multiple choice control (format checkbox);

date: edit box (format date);

decimal, long and integer: edit box (format text); and wireless data component: "Details" button.

For screens 476 associated to outgoing messages and their detail screens (not shown), the initial value of the data field 472 can be blank. The output mapping is used for the controls 474 whose value is to be transmitted further (e.g. to the detail screens). Further, the fields of type array (data fields 530 or message fields 524) can follow the following pattern, such as but not limited to:

for primitive fields of type array; and for fields of type array.

Example Generated WSDL 470

The following is an example generated set of WSDL definitions 470 for representing the interface 107 of the screen set 476 and associated workflow 478 as shown in FIG. 10.

```xml
<?xml version="1.0" encoding="UTF-8"?>
<definitions xmlns="http://schemas.xmlsoap.org/wsdl/"
             xmlns:xs="http://www.w3.org/2001/XMLSchema"
             xmlns:y="http://new.webservice.namespace"
             targetNamespace="http://new.webservice.namespace">
  <types>
    <xs:schema elementFormDefault="qualified"
               targetNamespace="http://new.webservice.namespace">
      <xs:complexType name="ArrayOfSpecials">
        <xs:sequence>
          <xs:element name="specials" type="xs:string"
            maxOccurs="unbounded"/>
        </xs:sequence>
      </xs:complexType>
    </xs:schema>
  </types>
  <message name="LoginRequest">
    <part name="userName" type="xs:string"/>
    <part name="password" type="xs:string"/>
  </message>
  <message name="LoginResponse">
    <part name="specials" type="y:ArrayOfSpecials"/>
  </message>
  <message name="RegisterRequest">
    <part name="userName" type="xs:string"/>
    <part name="password" type="xs:string"/>
  </message>
  <message name="RegisterResponse">
    <part name="name" type="xs:string"/>
    <part name="password" type="xs:string"/>
    <part name="street" type="xs:string"/>
    <part name="city" type="xs:string"/>
    <part name="postalCode" type="xs:string"/>
  </message>
  <message name="RegisterRequest1">
    <part name="name" type="xs:string"/>
    <part name="password" type="xs:string"/>
    <part name="street" type="xs:string"/>
    <part name="city" type="xs:string"/>
    <part name="postalCode" type="xs:string"/>
  </message>
  <message name="RegisterResponse1">
    <part name="specials" type="y:ArrayOfSpecials"/>
  </message>
  <portType name="typeName">
    <operation name="Login">
      <input message="y:LoginRequest"/>
      <output message="y:LoginResponse"/>
    </operation>
    <operation name="Register">
      <input message="y:RegisterRequest"/>
      <output message="y:RegisterResponse"/>
    </operation>
    <operation name="Register1">
      <input message="y:RegisterRequest1"/>
      <output message="y:RegisterResponse1"/>
    </operation>
  </portType>
  <binding name="bindingName" type="y:typeName">
    <operation name="Login">
      <input/>
      <output/>
    </operation>
    <operation name="Register">
      <input/>
      <output/>
    </operation>
    <operation name="Register1">
      <input/>
      <output/>
    </operation>
  </binding>
  <service name="serviceName"/>
</definitions>
```

Although the disclosure herein has been drawn to one or more exemplary systems and methods, many variations will be apparent to those knowledgeable in the field, including substitution of other appropriate editors 600 and viewers 602 than those used for exemplary purposes in the description. Further, it is recognised that the user interface 202 and the display 206 could be defined together as the user interface of the tool 116. Although XML and a subset of ECMAScript are used in the examples provided, other languages and language variants may be used to define component applications 105 as well as definition languages other than WSDL can be used to describe the interface 107. Further, other structured definition languages, than XML described above, can include such as but not limited to Resource Description Framework (RDF), XSLT, and XHTML.

The embodiments of the invention in which an exclusive property or privilege is claimed are defined as the follows:

1. A system for generating a service interface definition for a data source from an application definition, comprising:
   a component processor for examining a platform specific screen component and a platform neutral component forming a component based application the screen component having screen definitions to identify a screen control mapping identifying a transition between a source screen and a target screen;
   a service interface generation engine for generating a Web service definition for a Web service interface of a backend server of a data source, based on an operation definition describing an action supported by the data source, including:
   a module for constructing an outgoing message definition based on a data field in the source screen, and constructing an incoming message definition based on a data field in the target screen; and
   a module for constructing the operation definition having an input message and an output message, based on the identified transition, the outgoing message definition being assigned to the operation definition as the input message of the operation definition, the incoming message definition being assigned to the operation definition as the output message of the operation definition.

2. The system of claim 1 further comprising:
   a module for extracting the screen control mapping from the screen component.

3. The system of claim 2, wherein the screen control mapping comprises at least one of outgoing message definitions and incoming message definitions.

4. The system of claim 2, further comprising a data definition module for generating database data definitions matching the corresponding message definition set used in the service interface, based on the platform neutral component.

5. The system of claim 4, wherein the data definition module is configured for processing complex type ones of the data structure.

6. The system of claim 2 wherein the engine is configured for coordinating the processing of screen control mappings identified from a plurality of screen components.

7. The system of claim 2 further comprising a binding definition module for generating binding definitions for inclusion in the generated service interface.

8. The system of claim 1, wherein a first definition language expressing the screen component is the same as a second definition language expressing a message definition of the operation definition.

9. A method for generating a service interface definition for a data source from an application definition, comprising:

examining, by a component processor, a platform specific screen component and a platform neutral component forming a component based application the screen component having screen definitions;
identifying a screen control mapping identifying a transition between a source screen and a target screen;
generating a Web service definition for a Web service interface of a backend server of a data source, based on an operation definition describing an action supported by the data source, including:
   constructing an outgoing message definition based on a data field in the source screen;
   constructing an incoming message definition based on a data field in the target screen;
   generating the operation definition based on the identified transition, including assigning the outgoing message definition to the operation definition as the input message of the operation definition, and assigning the incoming message definition to the operation definition as the output message of the operation definition.

10. The method of claim 9 further comprising:
    extracting the screen control mapping from the screen component.

11. The method of claim 10 further comprising the step of generating database data definitions matching the message definition set used in the service interface.

12. The method of claim 11, wherein the data definition generator is configured for processing complex type ones of the data structure.

13. The method of claim 10 further comprising the step of coordinating the processing of screen control mappings identified from a plurality of screen components.

14. The method of claim 10 further comprising the step of generating binding definitions for inclusion in the generated service interface.

15. The method of claim 9, wherein a first definition language expressing the screen component is the same as a second definition language expressing a message definition of the operation definition.

16. A computer program medium storing computer executable codes for generating a service interface definition for a data source from an application definition, comprising:
    code for examining a platform specific screen component and a platform neutral component forming a component based application, the screen component having screen definitions;
    code for identifying a screen control mapping identifying a transition between a source screen and a target screen;
    code for generating a Web service definition for a Web service interface of a backend server of a data source, based on an operation definition describing an action supported by the data source, including:
       code for constructing an outgoing message definition based on a data field in the source screen;
       code for constructing an incoming message definition based on a data field in the target screen;
       code for generating the operation definition based on the identified transition, including assigning the outgoing message definition to the operation definition as the input message of the operation definition, and assigning the incoming message definition to the operation definition as the output message of the operation definition.

\* \* \* \* \*